US006408359B1

(12) United States Patent
Ito et al.

(10) Patent No.: US 6,408,359 B1
(45) Date of Patent: Jun. 18, 2002

(54) STORAGE DEVICE MANAGEMENT SYSTEM AND METHOD FOR DISTRIBUTIVELY STORING DATA IN A PLURALITY OF STORAGE DEVICES

(75) Inventors: Yukiko Ito, Moriguchi; Tsutomu Tanaka, Nishinomiya; Masaaki Tamai, Moriguchi; Shinzo Doi, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/435,369

(22) Filed: Nov. 8, 1999

Related U.S. Application Data

(62) Division of application No. 08/848,058, filed on Apr. 29, 1997, now abandoned.

(30) Foreign Application Priority Data

| | | |
|---|---|---|
| Apr. 30, 1996 | (JP) | 8-109183 |
| Jan. 29, 1997 | (JP) | 9-015239 |
| Mar. 31, 1997 | (JP) | 9-081647 |

(51) Int. Cl.[7] ........ G06F 12/00
(52) U.S. Cl. ........ 711/114
(58) Field of Search ........ 711/112, 114

(56) References Cited

U.S. PATENT DOCUMENTS

| | | |
|---|---|---|
| 5,487,035 A | 1/1996 | Nishimura et al. |
| 5,510,844 A | 4/1996 | Cash et al. |

FOREIGN PATENT DOCUMENTS

| | | |
|---|---|---|
| EP | 0 691 648 | 1/1996 |
| EP | 0 694 830 | 1/1996 |
| JP | 7-107425 | 4/1995 |

OTHER PUBLICATIONS

Berson, et al., Randomized Data Allocation for Real–Time Disk I/O; Compcon '96. 'Technologies for the Information Superhighway' Digest of Papers, Feb. 25–28, 1996, pp. 286–290.*

Hsieh J. et al., "Performance of a Mass Storage System for Video–On–Demand", vol. 30, No. 2, Nov. 1, 1995, Orland, pp. 147–167.

Rotem D. et al., "Buffer Management For Video Database Systems", Proceedings on Data Engineering, Taipei, Mar. 6–10, 1995, pp. 439–448.

Nikkei Communication 1993, 2. 15 No. 144, pp. 38–55.

D. James Gemmel, "Multimedia Storage Severs: A Tutorial" Computer vol. 28, No. 5, pp. 40–49, 1995.

* cited by examiner

*Primary Examiner*—David L. Robertson
(74) *Attorney, Agent, or Firm*—Wenderoth, Lind & Ponack, L.L.P.

(57) ABSTRACT

A configuration managing part stores the number of storage devices and respective identifying information. An empty area managing part stores empty-block addresses for each storage device. A destination determining part recognizes the number of storage devices with the information stored by the configuration managing part, and fetches one or more empty-block addresses for specifying empty storage areas included in each storage device from the empty area managing part. The destination determining part then repeatedly rearranges the empty-block addresses at random to determine destination of data.

32 Claims, 17 Drawing Sheets

| | SCSI ADDRESS | BLOCK ADDRESS |
|---|---|---|
| (a) | SCSIb | 1 |
| | SCSIa | 1 |
| | SCSIc | 1 |
| (b) | SCSIa | 2 |
| | SCSIc | 2 |
| | SCSIb | 2 |
| | SCSIc | 3 |
| | SCSIa | 3 |
| | ⋮ | ⋮ |

2102

| SCSI ADDRESS | BLOCK ADDRESS |
|---|---|
| SCSIc | 101 |
| SCSIb | 101 |
| SCSIa | 101 |
| SCSIb | 102 |
| SCSIa | 102 |
| SCSIc | 102 |
| SCSIa | 103 |
| SCSIb | 103 |
| ⋮ | ⋮ |

F I G. 7

2401

| | MSFS ADDRESS | SCSI ADDRESS | BLOCK ADDRESS |
|---|---|---|---|
| (a) | MSFS1 | SCSIb | 1 |
| | MSFS2 | SCSIa | 1 |
| (b) | MSFS2 | SCSIc | 1 |
| | MSFS1 | SCSIa | 1 |
| | MSFS2 | SCSIb | 1 |
| | MSFS1 | SCSIc | 1 |
| | MSFS1 | SCSIa | 2 |
| | MSFS2 | SCSIa | 2 |
| | ⋮ | ⋮ | ⋮ |

2402

| MSFS ADDRESS | SCSI ADDRESS | BLOCK ADDRESS |
|---|---|---|
| MSFS2 | SCSIa | 101 |
| MSFS1 | SCSIc | 101 |
| MSFS2 | SCSIc | 101 |
| MSFS1 | SCSIb | 101 |
| MSFS1 | SCSIa | 101 |
| MSFS2 | SCSIb | 101 |
| MSFS1 | SCSIa | 102 |
| MSFS2 | SCSIc | 102 |
| ⋮ | ⋮ | ⋮ |

F I G. 9

| COMPUTED DESTINATION VALUE OF THE STORAGE DEVICE 1805a (SCSIa) | COMPUTED DESTINATION VALUE OF THE STORAGE DEVICE 1805b (SCSIb) | COMPUTED DESTINATION VALUE OF THE STORAGE DEVICE 1805c (SCSIc) | STORAGE DEVICE TO BE SELECTED AT STEP S2507 |
|---|---|---|---|
| 0.0 | 0.0 | 0.0 | |
| 0.2 | 0.4 | 0.4 | |
| 0.4 | 0.8 | 0.8 | |
| 0.6 | ○ 0.2 | ○ 0.2 | STORAGE DEVICES 1805b, 1805c |
| 0.8 | 0.6 | 0.6 | |
| ● 0.0 | ● 0.0 | ● 0.0 | STORAGE DEVICES 1805a, 1805b, 1805c |
| 0.2 | 0.4 | 0.4 | |
| 0.4 | 0.8 | 0.8 | |
| 0.6 | 0.2 | 0.2 | STORAGE DEVICES 1805b, 1805c |
| 0.8 | 0.6 | 0.6 | |
| 0.0 | 0.0 | 0.0 | STORAGE DEVICES 1805a, 1805b, 1805c |
| . | . | . | |
| . | . | . | |

| | SCSI ADDRESS | BLOCK ADDRESS |
|---|---|---|
| (a) | SCSIb | 1 |
| | SCSIc | 1 |
| (b) | SCSIb | 2 |
| | SCSIa | 1 |
| | SCSIc | 2 |
| | SCSIb | 3 |
| | SCSIc | 3 |
| | SCSIa | 2 |
| | SCSIc | 4 |
| | SCSIb | 4 |
| | ⋮ | ⋮ |

2702

| SCSI ADDRESS | BLOCK ADDRESS |
|---|---|
| SCSIc | 101 |
| SCSIb | 101 |
| SCSIc | 102 |
| SCSIb | 102 |
| SCSIa | 101 |
| SCSIc | 103 |
| SCSIb | 103 |
| SCSIc | 104 |
| SCSIb | 104 |
| SCSIa | 102 |
| ⋮ | ⋮ |

F I G. 1 2

| COMPUTED DESTINATION VALUE OF THE GROUP (MSFS1) | COMPUTED DESTINATION VALUE OF THE STORAGE DEVICE 1807a (SCSIa) | COMPUTED DESTINATION VALUE OF THE STORAGE DEVICE 1807b (SCSIb) | COMPUTED DESTINATION VALUE OF THE STORAGE DEVICE 1807c (SCSIc) | COMPUTED DESTINATION VALUE OF THE GROUP (MSFS2) | COMPUTED DESTINATION VALUE OF THE STORAGE DEVICE 1807d (SCSIa) | COMPUTED DESTINATION VALUE OF THE STORAGE DEVICE 1807e (SCSIb) | COMPUTED DESTINATION VALUE OF THE STORAGE DEVICE 1807f (SCSIc) | STORAGE DEVICE TO BE SELECTED IN STEP S2808 |
|---|---|---|---|---|---|---|---|---|
| 0.0 | 0.0 | 0.0 | 0.0 | 0.0 | 0.0 | 0.0 | 0.0 | |
| 0.5 | 0.0 | 0.0 | 0.0 | 0.5 | 0.0 | 0.0 | 0.0 | |
| ○ 0.0 | 0.2 | -0.6 | 0.4 | ○ 0.0 | 0.2 | 0.4 | -0.6 | SELECT THE STORAGE DEVICES 1807b AND 1807f ● |
| 0.5 | 0.2 | -0.6 | 0.4 | 0.5 | 0.2 | 0.4 | -0.6 | |
| 0.0 | 0.4 | -0.2 | -0.2 | 0.0 | 0.4 | -0.2 | -0.2 | SELECT THE STORAGE DEVICES 1807c AND 1807e |
| 0.5 | 0.4 | -0.2 | -0.2 | 0.5 | 0.4 | -0.2 | -0.2 | |
| 0.0 | -0.4 | 0.2 | 0.2 | 0.0 | -0.4 | 0.2 | 0.2 | SELECT THE STORAGE DEVICES 1807a AND 1807d |
| 0.5 | -0.4 | 0.2 | 0.2 | 0.5 | -0.4 | 0.2 | 0.2 | |
| 0.0 | -0.2 | 0.6 | -0.4 | 0.0 | -0.2 | 0.6 | -0.4 | SELECT THE STORAGE DEVICES 1807c AND 1807f |
| 0.5 | -0.2 | 0.6 | -0.4 | 0.5 | -0.2 | 0.6 | -0.4 | |
| 0.0 | 0.0 | 0.0 | 0.0 | 0.0 | 0.0 | 0.0 | 0.0 | SELECT THE STORAGE DEVICES 1807b AND 1807e |
| . | . | . | . | . | . | . | . | |
| . | . | . | . | . | . | . | . | |

| MSFS ADDRESS | SCSI ADDRESS | BLOCK ADDRESS |
|---|---|---|
| (a) MSFS1 | SCSIb | 1 |
| (a) MSFS2 | SCSIc | 1 |
| MSFS2 | SCSIb | 1 |
| MSFS1 | SCSIc | 1 |
| MSFS2 | SCSIa | 1 |
| MSFS1 | SCSIa | 1 |
| MSFS2 | SCSIc | 2 |
| MSFS1 | SCSIc | 2 |
| MSFS2 | SCSIb | 2 |
| MSFS1 | SCSIb | 2 |
| MSFS1 | SCSIc | 3 |
| MSFS2 | SCSIb | 3 |
| MSFS2 | SCSIc | 3 |
| MSFS1 | SCSIb | 3 |
| MSFS1 | SCSIa | 2 |
| MSFS2 | SCSIa | 2 |
| ⋮ | ⋮ | ⋮ |

3002

| MSFS ADDRESS | SCSI ADDRESS | BLOCK ADDRESS |
|---|---|---|
| MSFS2 | SCSIb | 101 |
| MSFS1 | SCSIc | 101 |
| MSFS2 | SCSIc | 101 |
| MSFS1 | SCSIb | 101 |
| MSFS1 | SCSIa | 101 |
| MSFS2 | SCSIa | 101 |
| MSFS1 | SCSIb | 102 |
| MSFS2 | SCSIc | 102 |
| MSFS1 | SCSIc | 102 |
| MSFS2 | SCSIb | 102 |
| MSFS2 | SCSIc | 103 |
| MSFS1 | SCSIb | 103 |
| MSFS1 | SCSIc | 103 |
| MSFS2 | SCSIb | 103 |
| MSFS2 | SCSIa | 102 |
| MSFS1 | SCSIa | 102 |
| ⋮ | ⋮ | ⋮ |

| SCSI ADDRESS | BLOCK ADDRESS |
|---|---|
| SCSIb | 1 |
| SCSIb | 2 |
| SCSIb | 3 |
| SCSIb | 4 |
| SCSIa | 1 |
| SCSIa | 2 |
| SCSIa | 3 |
| SCSIa | 4 |
| SCSIc | 1 |
| SCSIc | 2 |
| SCSIc | 3 |
| SCSIc | 4 |
| SCSIa | 5 |
| SCSIa | 6 |
| SCSIa | 7 |
| SCSIa | 8 |
| . | . |
| . | . |

(a): rows SCSIb 1 through SCSIc 4

STORAGE DEVICE MANAGEMENT SYSTEM AND METHOD FOR DISTRIBUTIVELY STORING DATA IN A PLURALITY OF STORAGE DEVICES

This is a divisional application of Ser. No. 08/848,058 filed on Apr. 29, 1997 which is now abandoned.

BACKGROUND OF THE INVENTION

1. Field of the Invention

The present invention relates to a storage device management system, and more particularly to a storage device management system which allocates a destination of data to distributively store the data in a plurality of storage devices.

2. Related Art Statement

A video server is an apparatus which provides video data stored therein in real-time in response to individual requests from plural users. An exemplary video server is described in *Nikkei Communication* No. A144, Feb. 15, 1993: pp. 38–55. The video server can be applied to the VOD (Video On Demand) service and nonlinear video editing system. In these applications, requests for video data are generated asynchronously. Therefore, in one situation, single video data is simultaneously requested by plural users. In another situation, different kinds of video data are simultaneously and respectively requested by plural users. In order to deal with such multiple access situations and efficiently provide video data without interruption, the video server divides video data into unit blocks of a predetermined size, and distributes them among a plurality of storage devices mounted therein.

Various improvements have been made to video servers. There are two examples of such video servers as follows. One video server is disclosed in Japanese Patent Laid-Open No. 107425/1995. The other video server is described by D. James Gemmell in "Multimedia Storage Servers: A Tutorial," *Computer* Vol.28 (1995) No. 5: pp. 40–49.

To perform distribution, the video server disclosed in Japanese Patent Laid-Open No. 107425/1995 first arbitrarily selects one of the storage devices by using random numbers. Next, the video server distributes one unit block of data into the selected storage device. The video server repeatedly performs the above-mentioned selection and distribution.

To perform the above-mentioned distribution, the video server described in Gemmell's document selects one of the plural storage devices in accordance with a predetermined order. The video server then selects one of the unit blocks constituting the video data in an order from the start of the video data. Next, the video server distributes the selected unit block into the selected storage device. The video server repeatedly performs the above-mentioned selection and distribution.

When data is being distributed to the storage devices in the manner described in the above-described document by D. James Gemmell, for each data, an order of access to the storage devices is kept the same. Therefore, when requests are generated by plural users simultaneously, accesses to the same storage device are concentrated thereon. As a result, until an access to the storage device in compliance with a request is completed, the other accesses to the same storage device cannot be made, so that operations for the other requests are delayed. As a result, it takes a long time for a user to receive the requested data after sending out the request. Hence, the volume of data which is accessible in a unit of time decreases. Consequently, the volume of data (for example, the number of video programs) simultaneously retrieved from all of the storage devices become small.

Further, when requests for data with different access timings occur, the access timings of these requests eventually become equal even though the timings are first shifted in the video server side. Therefore, the above mentioned problems, such as the volume of data becoming small, may still occur. That is, shifting the access timings has little effect in such cases.

On the other hand, the video server of the above-mentioned Japanese Patent Laid-Open No. 107425/1995 determines destinations of the data by using random numbers. However, in some random numbers, there are some cases where units of blocks are sequentially distributed to the same storage device, and therefore, as mentioned above, the volume of data becomes small, the useable capacity of each storage device may vary, and thus the plural storage devices cannot be used in an efficient manner.

Also, for the next case, assume that the video server is provided with a plurality of storage devices each of which has respective different data access time intervals, capacity, and other performance characteristic, and that data is divided and distributed to each of the storage devices in the manner described in either of the above mentioned documents. In this case, the overall data access time interval, bandwidth, and the total stored data volume as a whole of the video server are dependent upon the particular storage device which has the lowest performance, and thereby the particular storage devices which have high performance cannot be used efficiently.

In comparing between a situation where a certain volume of data is divided and distributed to consecutive storage areas in the storage device and the situation where the data is divided and distributed to dispersed storage areas therein, the storage device can read out a larger volume of data over a designated time period from the consecutive storage areas than from the dispersed storage areas. Therefore, in a case where the video server is required to read a larger volume of data over a designated time period, the requests from a single user are processed sequentially by the video server even when requests have arrived from the plural users simultaneously. In this case, as is clear from the aforementioned description, the data to be read is preferably divided and distributed to consecutive storage areas of a single storage device. Therefore, due to the fact that the video servers disclosed in the above-mentioned two documents do not take into consideration the possibility of dividing and distributing data to consecutive storage areas of a single storage device as mentioned above, there are situations where the video servers disclosed in the two documents cannot process requests from users efficiently.

SUMMARY OF THE INVENTION

Therefore, a first object of the present invention is to provide a storage device management system capable of distributing data to a plurality of storage devices so as to deal with accesses from a plurality of storage devices without decreasing the volume of data read in a unit of time and to quickly respond to requests from users.

A second object of the present invention is to provide a storage device management unit capable of distributively storing data to a plurality of storage devices so that the same volume of data is stored in each storage device.

In accordance with an aspect of this invention, a storage device management system of distributively storing data-blocks, which data is divided into, as a unit for writing to a plurality of storage devices, wherein each of the storage devices is provided with a different first identifier, comprising: a first managing part for managing at least the first identifiers; a second managing part for managing an empty area of each of the storage devices using an address of each empty block into which the data-block can be written and the first identifier; and a destination determining part for determining destinations of the data, by creating a set of the first identifier and the address for each storage device by referring to the first and second managing parts and rearranging the created sets at random.

As described above, the storage device management system in accordance with this aspect determines destinations of data so that data is equally distributed to the plural storage devices. Therefore, when data is read, access does not concentrate on a specific storage device but is made equally to all storage devices. Thus, a sufficiently large volume of data can be obtained from all of the storage devices. As a result, the storage device management system can respond to read requests for data at high speed.

In accordance with another aspect of this invention, in a storage device management system of distributively storing data-blocks, which data is divided into, as a unit for writing to a plurality of storage devices divided into predetermined groups, each of the storage devices belonging to a same group is provided with a different first identifier, and each of the groups is provided with a different second identifier, comprising: a first managing part for managing at least the first identifiers and the second identifiers; a second managing part for managing an empty area of each of the storage devices using an address of each empty block into which the data-block can be written and the first and second identifiers; and a destination determining part for determining destinations of the data, wherein the destination determining part selects all or part of the groups by referring to the first and second managing parts; selects one storage device for each group at random so that the same storage device is not selected until all storage devices belonging to the group are selected; creates a set of the first and second identifiers and the address for each of the selected storage devices; and rearranges the created sets at random.

As described above, the storage device management system in accordance with this aspect determines destinations of data so that when the system manages plural storage devices which are divided into plural groups, the data-blocks composing data are equally distributed to each group and also to the storage devices belonging to each group. Therefore, a sufficiently large volume of data can be obtained from all the storage devices due to the fact that when reading of data is performed, access requests do not concentrate on the storage devices belonging to a specific group and in each storage device belonging to each group, and access requests are made equally to all groups and storage devices belonging to each group.

Further, like the previous aspect, the order of access to the storage devices when data written into the storage devices is read according to the above-described destination of data is different from the order for each of the other data. Therefore, the storage device management system can respond to the read request of data at high speed.

These and other objects, features, aspects and advantages of the present invention will become more apparent from the following detailed description of thee present invention when taken in conjunction with the accompanying drawings.

BRIEF DESCRIPTION OF THE DRAWINGS

FIG. 4 is a diagram showing examples of the address position file created by the destination determining part 1803 according to the first embodiment.

FIG. 7 is a diagram showing examples of an address position file created by the destination determining part 1803 according to the second embodiment.

FIG. 9 is a diagram showing changes in the computed destination values for the first identifiers SCSIa to SCSIc when steps S2505 and S2506 are executed repeatedly, and showing the storage devices 1805 to be selected in step S2507.

FIG. 10 is a diagram showing one example of an address position file created by the destination determining part 1803 according to the third embodiment.

FIG. 12 is a diagram showing changes in the computed destination values for MSFS1 and MSFS2 and their SCSIa to SCSIc when steps S2805 and S2806 are executed repeatedly, and also showing the storage devices 1807 to be selected in step 2808.

FIG. 13 is a diagram showing one example of an address position file created by the destination determining part 1803 according to the fourth embodiment.

FIG. 18 is a diagram showing one example of an address position file created by the destination determining part 1803 according to the seventh embodiment.

DESCRIPTION OF THE PREFERRED EMBODIMENTS

Figure 1:
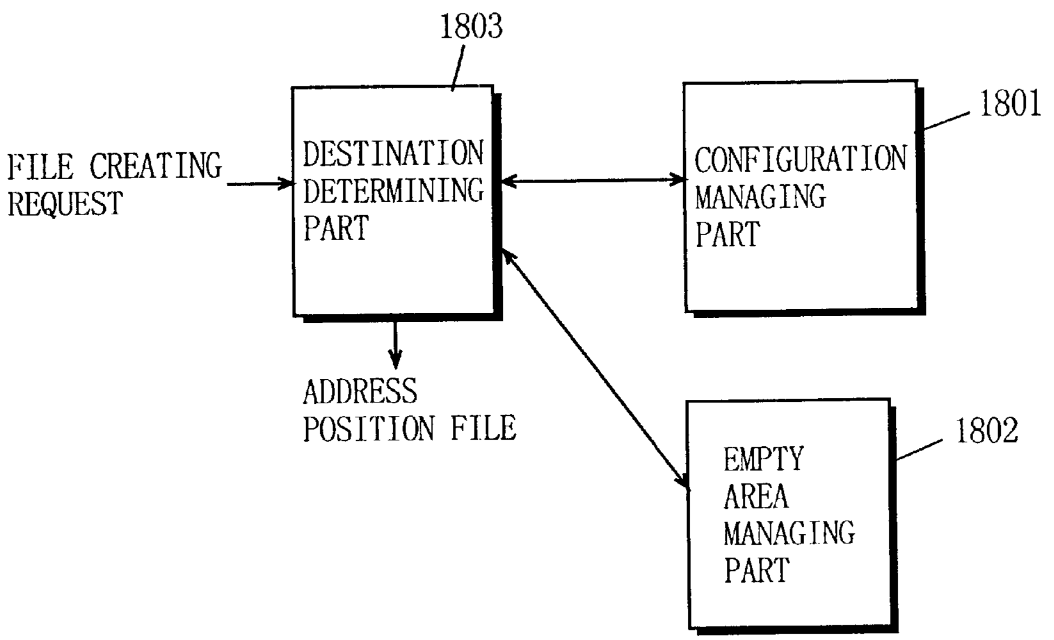
FIG. 1 is a block diagram showing a storage device management system according to the first to the seventh embodiments of the present invention.

FIG. 1 is a block diagram which shows the configuration of the storage device management system according to the first embodiment of the present invention (hereinafter, "the present system"). In FIG. 1, the present system includes a configuration managing part 1801, an empty area managing part 1802, and an destination determining part 1803. The present system creates an address position file to determine destination data-blocks which data is divided into. On the basis of the address position file and destination data blocks, the data is distributively stored into external plural storage devices.

The configuration managing part 1801 stores the information about the number of above-described storage devices and first identifiers to identify each of the storage devices.

The empty area managing part 1802 stores empty blocks, in which an empty area of each of the storage devices is divided into (one data-block is able to be stored in each of the empty blocks), using addresses of the empty blocks and the first identifiers.

Figure 3:
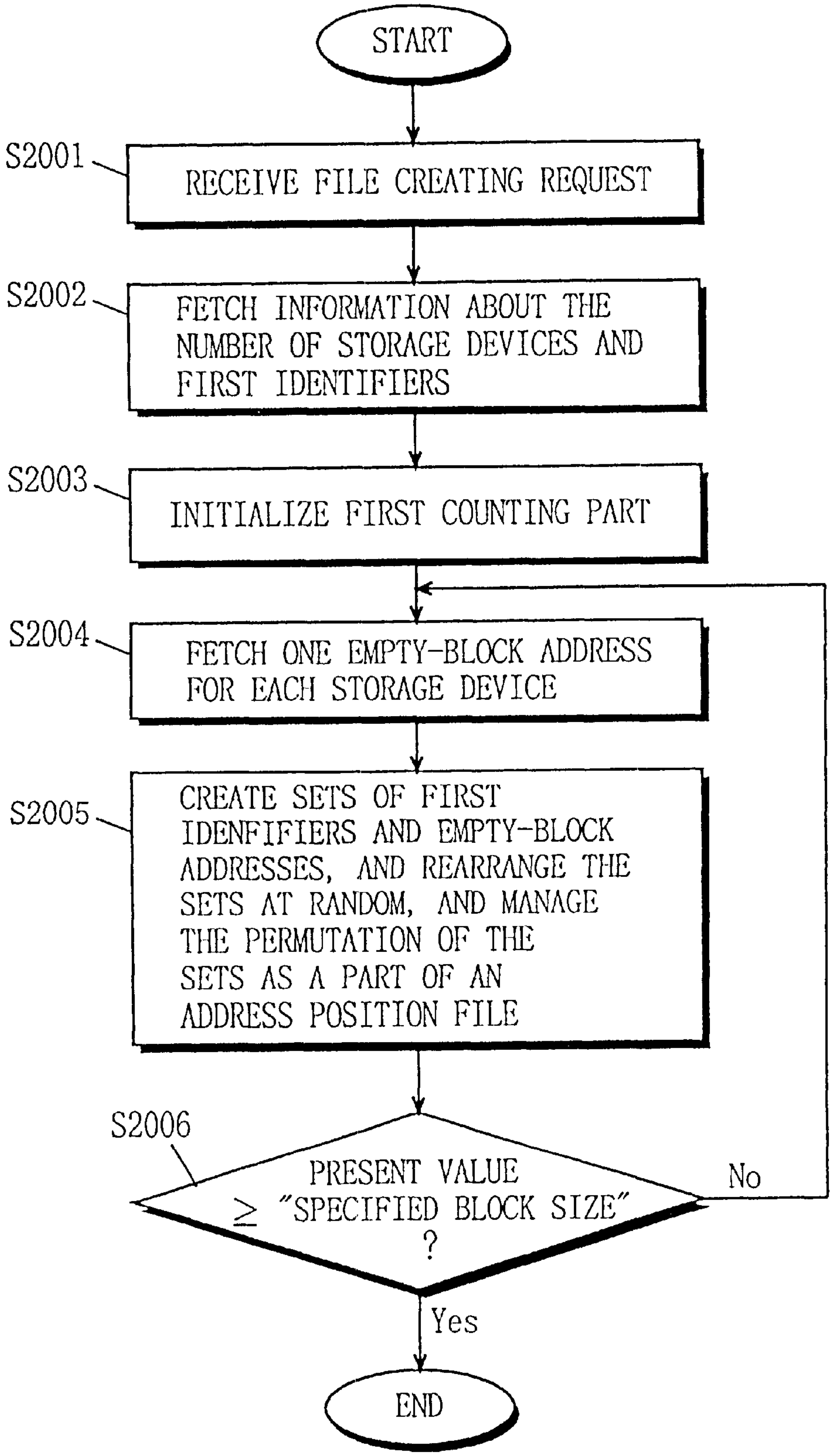
FIG. 3 is a flowchart showing the procedure of the destination determining part 1803 according to the first embodiment.

The destination determining part 1803 creates address position files by executing the operations according to the flow chart of FIG. 3, and determines destinations of each data-block using the first identifiers and the addresses of the empty blocks.

Figure 2:
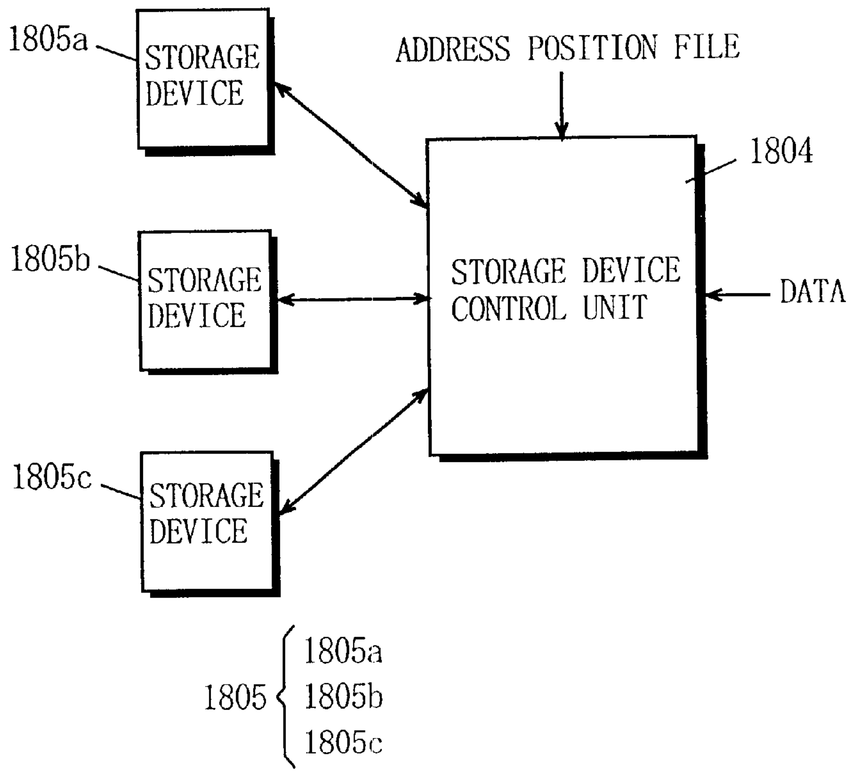
FIG. 2 is a block diagram showing peripheral devices of the storage device management system according to the first, the third and the fifth to seventh embodiments.

FIG. 2 shows an example of the storage devices to be managed by the present system, and shows three storage devices 1805*a*~1805*c* and one storage device control unit 1804 which, for example, is capable of writing data into these storage devices.

The storage devices 1805*a*, 1805*b* and 1805*c* are provided with SCSI addresses, SCSIa, SCSIb and SCSIc as the first identifiers, respectively, which are different from SCSI addresses of other storage devices.

When the present system creates address position files for the plural storage devices shown in FIG. 2, the configuration managing part 1801 stores the first identifiers SCSIa, SCSIb and SCSIc, and "3" as the number of storage devices.

The empty area managing part 1802 stores the addresses of the empty blocks in each SCSI address, that is to say, stores the empty blocks of each of the storage devices 1805*a*~1805*c*. In order to describe the present system more specifically, it is assumed, for example, that the storage devices 1805*a*~1805*c* each have 1000 empty blocks, and the empty area managing part 1802 stores the empty-block addresses "1" to "1000" of each of the storage devices.

Referring to the flow chart shown in FIG. 3, operations of the present system will be described in detail below.

An external device (not shown) located outside the present system, when having a necessity to write data into the storage devices, outputs a file creating request for requesting the creation of address position files regarding the data. The file creating request includes the information specifying the number of empty blocks which are necessary to write the data (hereinafter, "specified block size").

The destination determining part 1803 receives the file creating request from the external device (step S2001), and extracts the "specified block size" from the file creating request and latches it.

Next, the destination determining part 1803 fetches the information about the number of storage devices and the first identifiers from the configuration managing part 1801 (step S2002), and recognizes the configuration of the storage devices to be managed based upon the fetched information.

When the present system manages plural storage devices as shown in FIG. 2, the destination determining part 1803 fetches "3" as the number of storage devices, and the identifiers SCSIa to SCSIc in step S2002. With the fetched information, the destination determining part 1803 recognizes the configuration of the plural storage devices as shown in FIG. 2.

Next, the destination determining part 1803 initializes a counting part (not shown) incorporated therein which is used to total the number of empty-block addresses fetched in the following step S2004 (step S2003).

Next, the destination determining part 1803 fetches, from the empty area managing part 1802, one empty-block address for each of the storage devices provided with the first identifiers fetched in step S2002 (step S2004). Specifically, the destination determining part 1803 fetches the first identifiers SCSIa to SCSIc as described above, and fetches "1" as the respective empty-block address for each of the first identifiers SCSIa to SCSIc in step S2004.

Next, the destination determining part 1803 creates sets of the fetched first identifiers and the fetched empty-block addresses corresponding to the first identifiers. Then, the destination determining part 1803 generates permutations of the sets at random, and thereby rearranges the sets, and manages the rearranged sets as a part of an address position file (step S2005).

As described above, the destination determining part 1803, in the case of fetching the empty-block address "1" for each of the first identifiers SCSIa to SCSIc as described above, creates three sets (SCSIa;1), (SCSIb;1) and (SCSIc;1) in step S2005, wherein the numeral on the right side in each parentheses means an empty-block address. Then, the destination determining part 1803 rearranges these three sets at random. Thus, the permutation of the three sets [(SCSIb;1), (SCSIa;1), (SCSIc;1)] is determined as a part of one address position file (see column (a) in FIG. 4).

Next, the destination determining part 1803, after incrementing the value of the counting part by the number corresponding to fetched empty-blocks in step S2004, compares the present indicated value of the counting part with the "specified block size" (step S2006). When the above-described present indicated value is smaller than the "specified block size", the destination determining part 1803 judges that address position files corresponding to the "specified block size" have not been created, and then executes a loop (steps S2004~S2006). When, on the other hand, the present indicated value is the "specified block size" or larger, the destination determining part 1803 judges that the address position files corresponding to the specified block size have been created, and then ends the operations in the flow chart of FIG. 3.

Specifically, when the destination determining part 1803 fetches three empty-block addresses as described above, and, in step S2006, increments the present indicated value "0" of the counting part by the number of these empty-block addresses "3", and compares the present indicated value of the counting part "3" with the "specified block size". Here, when the present indicated value "3" is smaller than the "specified block size", the destination determining part 1803 executes the loop (steps S2004 to S2006) again. In this loop, for example, it is assumed that a permutation [(SCSIa;2), (SCSIc;2), (SCSIb;2)] is determined as a part of the address position file (see column (b) in FIG. 4). Then, the destination determining part 1803 increments the present indicated value "3" of the counting part by the number of empty-block addresses "3", and compares the present indicated value "6" with the "specified block size". Thus, the destination determining part 1803 executes the loop (steps S2004 to S2006) repeatedly until the present indicated value of the counting part reaches the "specified block size" or more.

A first address position file 2101 shown in FIG. 4 is a file created according to the above-described example. Note that FIG. 4 also shows a second address position file 2102 created by the destination determining part 1803 in compliance with another file creating request. It is noted that the second address position file 2102 is created in the same manner as discussed above for the first address position file 2102.

The first and the second address position files 2101 and 2102 are composed of sets of the SCSI addresses and the empty-block addresses. The first and the second address position files 2101 and 2102 are created so that the storage device control unit 1804 shown in FIG. 2 can uniquely understand the address positions of the storage devices into which data-blocks composing the data are to be written. The storage device control unit 1804 divides inputted data into data-blocks, and writes the data-blocks into the storage devices 1805 according to address position files outputted through the other line than the data. Here, when the storage device control unit 1804 refers to the first address position file 2101, the first data-block is written into the empty-block address "1" of the storage device 1805*b* (the SCSI address SCSIb), and the second data-block is written into the empty-block address "1" of the storage device 1805*a* (the SCSI address SCSIa). Hereinafter, in the same way, data-blocks are successively written into the empty area of the storage devices determined by the address position file, (SCSIc;1), (SCSIa;2) . . . . Thus, the data-blocks composing the data to be written are distributed to plural storage devices.

As described above, the present system, when managing plural storage devices, creates address position files so as to distribute data equally to the plural storage devices. Thereby, when data is read, the access does not concentrate in specific storage devices and is performed equally to all storage devices. Therefore, when the data distributed by the above-described manner are read out, larger volume of data can be retrieved from the whole storage devices in a unit of time.

Furthermore, when data is read, as understood by referring to the first and the second address position files 2101 and 2102, the orders of access to each storage device are different from each of the data read out. Therefore, even if requests for reading the data which have different access intervals to storage devices are generated simultaneously, because the data has different orders of access, the present system has no necessity to delay the "access timing" intentionally as described in the "related art statement". Therefore, this leads to an effect of shortening the time which users need in order to retrieve data. Moreover, this leads to another effect, that is, when storage devices have requests for data which require different bandwidths from each other, the present system can prevent the access timing from becoming synchronous, as described in the "related art statement", because of the difference in orders of access of the data. These two above-described effects are also applied in the second through seventh embodiments described below.

Also, although the present system distributes data to all storage devices in the above description, data may be distributed to specific storage devices, as is applied to the third and, fifth to seventh embodiments described in detail below.

Moreover, as understood by referring to the first or the second address position file 2101 or 2102 in step S2004 shown in FIG. 3, the empty-block addresses of each storage device can be fetched in the order of the empty-block addresses or the empty-block addresses may be fetched at random, as is applied to the second to seventh embodiments described in detail below. The particular order of fetching is not restrictive due to the fact that the destination determining part, in step S2005 shown in FIG. 3, rearranges the created sets at random.

Although the storage medium in the storage device is assumed to be a magnetic disk drive in the above description, the storage medium may be a CD-I (CD-Interactive) drive, MOD (Magnetic Optical Disk Drive), or other storage devices that can read and write data. This is also applicable to the second to seventh embodiments.

Next, the storage device management system according to a second embodiment of the present invention (hereinafter, "the present system") will be described.

Because the configuration of the present system is the same as shown in FIG. 1, its schematic representation and outline of the configuration will be omitted, and the same reference numbers as used in FIG. 1 will also be used in the description found below. However, the configuration of plural storage devices to be managed by the present system and other devices is different from the configuration shown in FIG. 2, and, as described below, parts of the configuration of the present system are different from the parts described in the first embodiment.

Here, the plural storage devices to be managed by the present system are arranged into plural groups in advance. Each group is provided with a second identifier to identify each group, which is different from the second identifiers of other groups. Moreover, each storage device is provided with a first identifier which is different from the first identifiers of other storage devices of the same group.

The configuration managing part 1801 stores the first identifiers, the second identifiers, the information about the number of storage devices to be managed by the present system, and the information about the number of groups of the storage devices.

The empty area managing part 1802 stores empty blocks of each storage device (see the first embodiment) using the addresses of the empty blocks and the first and the second identifiers.

Figure 6:
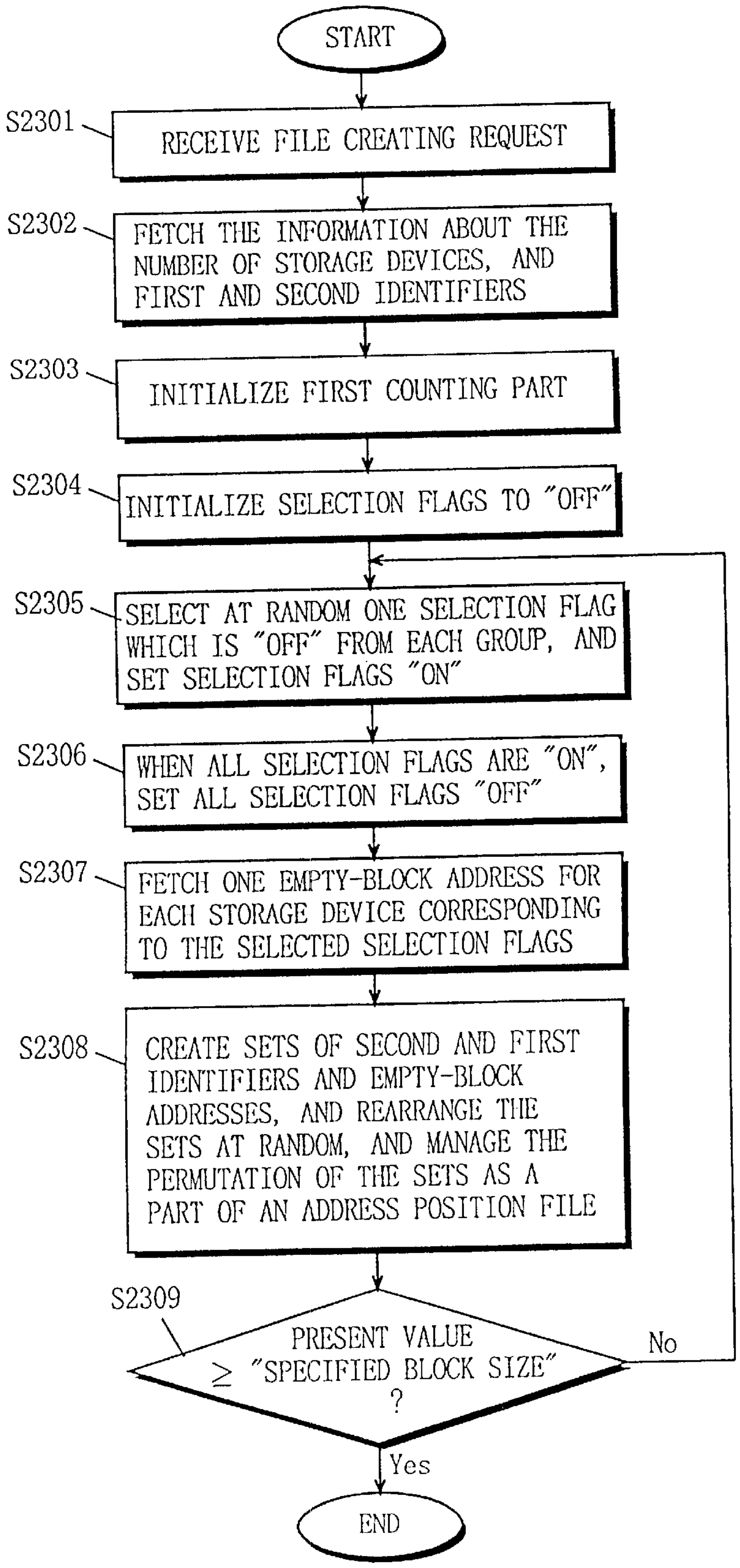
FIG. 6 is a flowchart showing the procedure of the destination determining part 1803 according to the second embodiment.

The destination determining part 1803 executes operations according to the flow chart of FIG. 6, and determines destinations of data for each of the data-blocks using the first and the second identifiers and the empty-block addresses.

Figure 5:
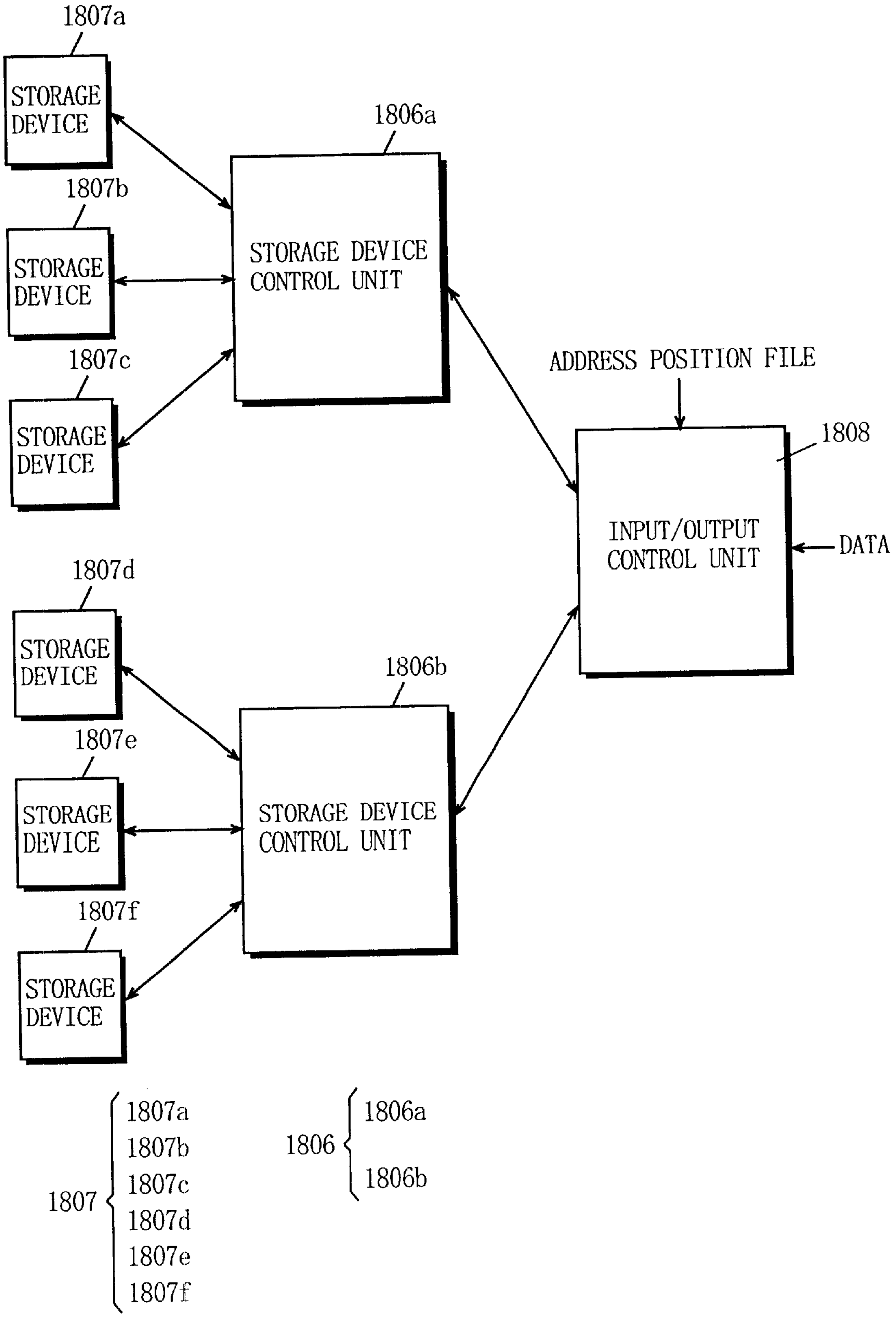
FIG. 5 is a block diagram showing an example of peripheral devices of the storage device management system according to the second and the fourth embodiment.

FIG. 5 shows a configuration example of the storage devices to be managed by the present system, and shows six storage devices 1807 (1807*a* to 1807*f*), two storage device control units 1806 (1806*a* and 1806*b*), and one input/output control unit 1808.

As shown in FIG. 5, three storage devices (the storage devices 1807*a* to 1807*c*) of the six storage devices are connected with the input/output control unit 1808 through the storage device control unit 1806*a*, and the rest of the storage devices 1807*d* to 1807*f* are connected with the input/output control unit 1808 through the storage device control unit 1806*b*.

The storage device control units 1806*a* and 1806*b*, for example, write data into the storage devices 1807*a* to 1807*c* and 1807*d* to 1807*f*, respectively.

The input/output control unit 1808, according to address position files received from the present system, distributes data-blocks into which data inputted from the external device is divided and the address position files to the storage device control units 1806*a* and 1806*b*.

Each of the storage devices 1807 is provided with a SCSI address as the first identifier, and specifically, the storage devices 1807*a* to 1807*c* are provided with SCSI addresses SCSIa to SCSIc, respectively, and the storage devices 1807*d* to 1807*f* are also provided with SCSI addresses, SCSIa to SCSIc, respectively.

The storage device control units 1806*a* and 1806*b* are provided with MSFS (Media Segment File Server) addresses MSFS1 and MSFS2, respectively, as the second identifiers, which are different from each other. Then the plural storage devices 1807 are arranged into groups by the MSFS addresses, and are specified by the MSFS addresses and the SCSI addresses. Specifically, in the description provided below, the groups specified by the MSFS addresses MSFS1 and MSFS2 are referred to as the group 1 and the group 2, respectively.

When the present system determines address position files for the plural storage devices (see FIG. 5), the configuration managing part 1801 stores the second identifiers MSFS1 and MSFS2, and also stores the first identifiers SCSIa to SCSIc for each of the second identifiers. Also, the configuration managing part 1801 stores "2" as the number of groups of the storage devices, and "6" as the number of storage devices.

The empty area managing part 1802 stores the empty-block addresses "1" to "1000" of each of the storage devices 1807 for each MSFS address and each SCSI address.

Referring to the flow chart shown in FIG. 6, operations of the present system will be described in detail below.

As described in the first embodiment, an external device outputs a file creating request including "specified block size" and data.

The destination determining part 1803 receives the file creating request from the external device (step S2301), and extracts the "specified block size" from the file creating request and latches it.

Next, the destination determining part 1803 fetches the first and the second identifiers, the information about the number of storage devices, and the information about the number of groups of the storage devices from the configuration managing part 1801 (step S2302). Thereby, the destination determining part 1803 recognizes the configuration of the storage devices to be managed.

Specifically, when the present system manages plural storage devices as shown in FIG. 5, the destination determining part 1803 fetches the second identifier MSFS1 and the first identifiers SCSIa to SCSIc, the second identifier MSFS2 and the first identifiers SCSIa to SCSIc, "6" as the number of storage devices, and "2" as the number of groups of the storage devices, in step S2302. The destination determining part 1803 thereby recognizes the configuration of the storage devices shown in FIG. 5.

Next, the destination determining part 1803 initializes the counting part (step S2303) which is the same as described in the first embodiment.

Next, the destination determining part 1803 initializes a selection flag for each of the storage devices to "OFF" (step S2304). That is, the destination determining part 1803 initializes the selection flag for each of the first identifiers fetched in step S2302. The selection flag is held in the destination managing portion 1803 and shows whether the storage device provided with the selection flag has been selected as the storage device from which an empty-block address should be fetched, or not.

The destination determining part 1803, when fetching the first identifiers SCSIa to SCSIc for each of the second identifiers MSFS1 and MSFS2 as described above, sets six selection flags "OFF" in step S2304.

Next, to select, for each group, a storage device from which the empty address block is fetched, the destination determining part 1803 selects the first identifier assigned with a selection flag currently indicating "OFF". Also, the destination determining part 1803 changes the selection flag assigned to the selected first identifier to "ON".

In the above-mentioned case where six selection flags are set, the destination determining part 1803 selects one SCSI address from each of the group 1 and the group 2, and turns "ON" the selection flags for the selected SCSI addresses. Specifically, assume herein that SCSIb is selected from the group 1, and the SCSIa is selected from the group 2.

Next, the destination determining part 1803 determines whether the selection flags of the storage devices of each group all indicate "ON". If all flags are "ON", the destination determining part 1803 turns them "OFF" (step S2306). Thus, it is possible to select a storage device from any group even in the next loop (steps S2305 to S2309).

Specifically, when all selection flags for the first identifiers SCSIa to SCSIc of the group 1 are "ON", the destination determining part 1803 sets all of the selection flags to "OFF".

Next, the destination determining part 1803 fetches one empty-block address for each of the storage devices (specified by the second and the first identifiers) selected in step S2305, from the empty area managing part 1802 (step S2307).

Specifically, the destination determining part 1803 selects the first identifier SCSIb from the group 1 and the first identifier SCSIa from the group 2 as described above, and fetches "1" as the respective empty-block addresses in step S2307.

Next, the destination determining part 1803 creates a set of the first identifier selected in step S2306, the second identifier indicating the group of the first identifier, and the empty-block address fetched in step S2307. Then, the destination determining part 1803 rearranges the sets at random as described in the first embodiment, and manages the permutation of the sets as a part of an address position file (step S2308).

As described above, the destination determining part 1803, fetching the empty-block address "1" for the second identifier MSFS1 and the first identifier SCSIb, and also for the second identifier MSFS2 and the first identifier SCSIa, creates two sets (MSFS1;SCSIb;1) and (MSFS2;SCSIa;1) instep S2308, wherein the numeral on the right side in the each parenthesis means an empty-block address. Then, the destination determining part 1803 rearranges these sets at random. Here, it is assumed that the permutation of the sets [(MSFS1;SCSIb;1), (MSFS2;SCSIa;1)] is determined as the address position file (see column (a) in FIG. 7).

Next, the destination determining part 1803, after incrementing the value of the counting part by the number corresponding to fetched empty-blocks in step S2307, compares the present indicated value of the counting part with the "specified block size" (step S2309). When the present indicated value is smaller than the "specified block size", the destination determining part 1803 executes a loop (steps S2305 to S2309) again. On the other hand, when the present indicated value is the "specified block size" or larger, the destination determining part 1803 ends the operations according to the flow chart shown in FIG. 6.

Specifically, when two empty-block addresses are fetched, the address file creating part 1803 increments the value of the counting part by "2". Here, when the present indicated value of the counting part "2" is smaller than the "specified block size", the destination determining part 1803 executes the loop (steps S2305~S2309) again. In the loop currently executed, it is assumed that [(MSFS2;SCSIc;1), (MSFS1;SCSIa;1)] is determined as the second part of the address position file (see column (b) in FIG. 7). Then, the destination determining part 1803 increments the value of the counting part by "2". As a result, the present indicated value becomes "4". Next, the address file creating part 1803 compares the present indicated value "4" with the "specified block size". Thus, the destination determining part 1803 executes the loop (step S2305 to S2309) repeatedly until the present indicated value of the counting part reaches the "specified block size" or larger.

A first address position file 2401 shown in FIG. 7 is created according to the above-described example. FIG. 7 also shows a second address position file 2402 created by the destination determining part 1803 after accepting another file creating request. It is noted that the second address position file 2402 is created in the same manner as discussed above for the first address position file 2401.

The first and second address position files 2401 and 2402 are composed of the sets of the MSFS addresses, the SCSI addresses, and the empty-block addresses. Thereby the input/output control unit 1808 can uniquely understand the storage device control units 1806 connected with the storage devices in which data-blocks should be written into. Also, the storage device control units 1806 can uniquely understand the empty-block addresses of the storage devices which the data-blocks should be written into by referring to the first and second address position files 2401 and 2402. The input/output control unit 1808 receives the address position file created by the destination determining part 1803. Further, the input/output control unit 1808 receives data-blocks, which the data is divided into, through a different line from that of the address position file. The input/output control unit 1808 distributes the received data-block to the storage device control units 1806 according to the received address position file. The storage device control units 1806 write the data-blocks received from the input/output control unit 1808 into the storage devices 1807 according to the address position files. Here, when the input/output control unit 1808 and the storage device control units 1806 follow the first address position file 2401, the first data-block is written into the empty-block address "1" of the storage device 1807*b* (MSFS1 ;SCSIb), and the second data-block is written into the empty-block of the storage device 1807*d* (MSFS2;SCSIa) which address is "1". Hereinafter, in the same way, data-blocks are written into the empty blocks of the storage devices determined by the address position files, (MSFS2;SCSIc;1), (MSFS1;SCSIa;1), . . . . Thereby, the data-blocks, which the data is divided into, are distributed to plural storage devices arranged to plural groups.

As described above, the present system, when managing plural storage devices divided into plural groups, creates address position files so as to equally distribute data-blocks to the plural groups, and also to distributively and equally store the data-blocks to the storage devices in each group. Thereby, when data is read, the accesses do not concentrate in specific groups of the storage devices, and also do not concentrate in specific storage devices in each of the groups, that is, accesses to the storage devices are made equally to all of the groups and also equally to all of the storage devices in each of the groups. Therefore, when the data distributed by above-described manner are read out, a larger volume of data can be retrieved from the whole storage devices in a unit of time.

Moreover, although data is distributed to all storage devices in each group in the above embodiment, data may be distributed to specific storage devices in each group.

Next, the storage device management system according to a third embodiment of the present invention (hereinafter, "the present system") will be described.

Because the configuration of the present system and the embodiment of storage devices to be managed by the present system and other devices is the same as shown in FIGS. 1 and 2, the same schematic representation and outlines will be omitted, and the same reference numbers as used in FIGS. 1 and 2 will also be used in the description found below. However, because the information managed by the configuration managing part 1801 and the operation process executed by the destination determining part 1803 are different from that described in the previous embodiments, the difference will be described in detail. Also, because the information managed by the empty area managing part 1802 is the same as described in the first embodiment, an explanation about it will be omitted.

The configuration managing part 1801 stores the information about the number of storage devices and first identifiers as described in the first embodiment, and moreover, stores "distribution rates" of the storage devices.

Figure 8:
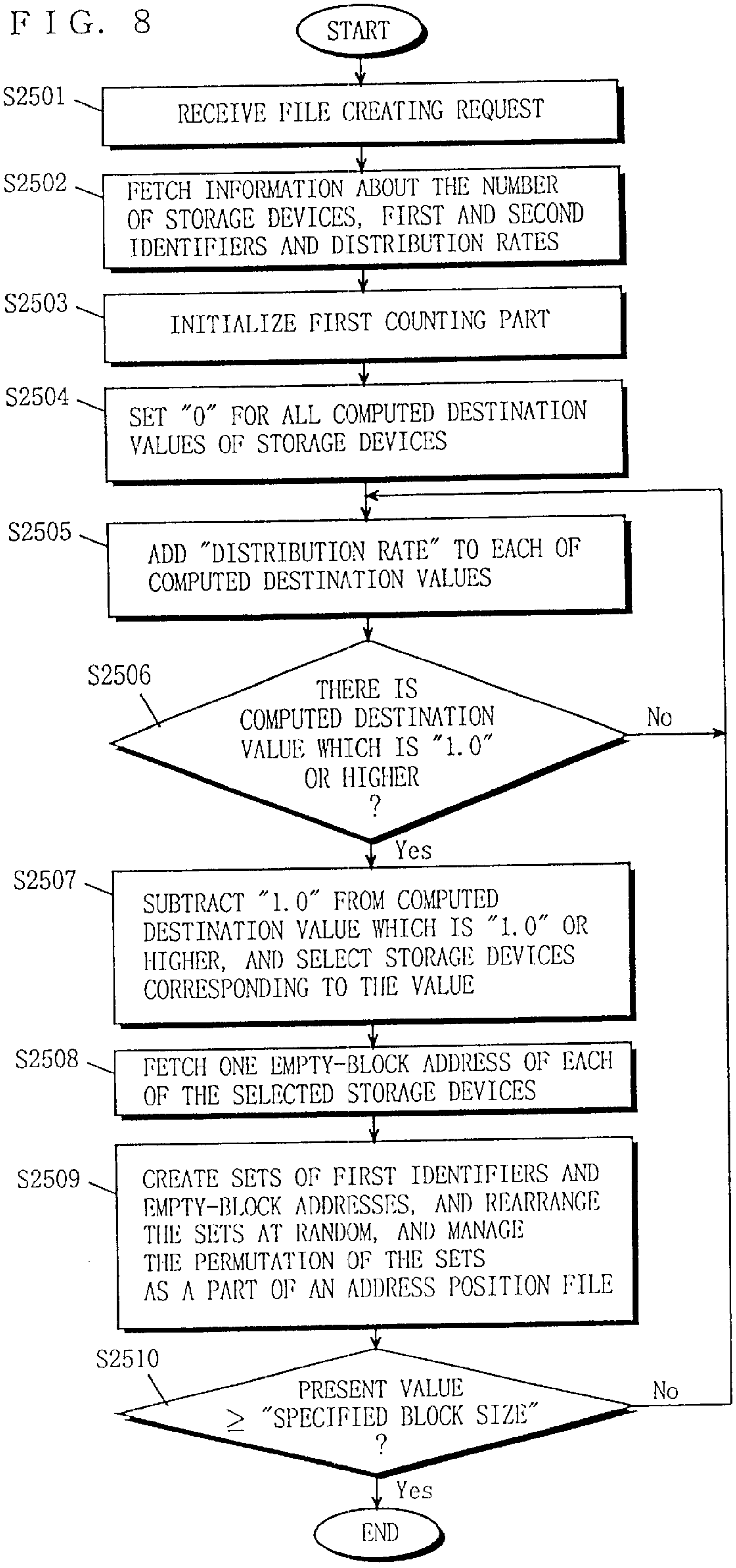
FIG. 8 is a flowchart showing the procedure of the destination determining part 1803 according to the third embodiment.

The destination determining part 1803 executes operations according to the flow chart shown in FIG. 8, and, by taking into consideration the "distribution rates", the destination determining part 1803 determines the destination where the data is to be stored in the storage devices using the first identifiers and the empty-block address.

A description of, "distribution rates" will now be provided. A "distribution rate" of a storage device is using the bandwidth (that is, volume of the data which can be written/read in a unit of time from the whole storage devices) and/or the capacity of the storage device. The "distribution rate" means a rate that shows the number of data-blocks stored in each storage device compared to all data-blocks composing the data to be distributively stored in the whole storage devices. Specifically, the "distribution rate" can be calculated by methods (a) to (c) described below.

(a) To find the "distribution rate" of a given storage device with respect to the bandwidth of the storage devices, the following equation (2) is used:

(The bandwidth of the storage device)/(the total bandwidths of all storage devices) (2)

Here, it is assumed that plural storage devices are the storage devices 1805*a*, 1805*b*, and 1805*c* shown in FIG. 2, and that the bandwidths of the storage devices 1805*a*, 1805*b*, and 1805*c* are 1 Mbps, 2 Mbps, and 2 Mbps, respectively. The "distribution rate" of the storage device 1805*a* can be calculated as follows by the above-described equation (2).

1 Mbps/(1 Mbps+2 Mbps+2 Mbps)=⅕

With the same equation, the "distribution rates" of the storage devices 1805 and 1805*c* can be found as ⅖ and ⅖, respectively.

(b) To find the "distribution rate" of a given storage device with respect to the capacity of the storage devices, the following equation (3) is used:

(The capacity of the storage device)/(the total of the capacity of all storage devices) (3)

Here, as described above, it is assumed that the capacity of the storage devices 1805*a*, 1805*b*, and 1805*c* is 2 GB, 2 GB, and 4 GB, respectively. The "distribution rate" of the storage device 1805*a* can be found as follows by the above-described equation (3).

$$2\ GB/(2\ GB+2\ GB+4\ GB)=2/8$$

With the same equation, the "distribution rates" of the storage devices 1805*b* and 1805*c* can be found as 2/8 and 4/8, respectively.

(c) To find the "distribution rate" of a given storage device in consideration of the bandwidths and the capacity of the storage devices, the following equation (4) is used:

$$\{(\text{The bandwidth of the storage device})/(\text{the total bandwidths of all storage devices})\}\times\alpha+\{(\text{the capacity of the storage device})/(\text{the total of the capacity of all storage devices})\}\times(1-\alpha) \quad (4)$$

Here, $\alpha$ and $(1-\alpha)$ are rates indicating how the bandwidth and the capacity are taken into consideration to determine the "distribution rates", where $\alpha$ satisfies $0<\alpha<1$.

Here, as described above, it is assumed that the bands and the capacity of the storage devices 1805*a*, 1805*b*, and 1805*c* are 1 Mbps and 2 GB, 2 Mbps and 2 GB, and 3 Mbps and 4 GB, respectively, and that a is 3/5. The "distribution rate" of the storage device 1805*a* can be found as follows by the above-described equation (4).

$$1/6\times3/5+2/8\times2/5=1/5$$

With the same equation, the "distribution rates" of the storage devices 1805*b* and 1805*c* can be found as 3/10 and 1/2, respectively.

When the present system manages the plural storage devices as shown in FIG. 2 and the "distribution rates" of the storage devices are found by the above-described method (a), the configuration managing part 1801 stores "3", the number of storage devices; first identifiers SCSIa, SCSIb and SCSIc; and "0.2", "0.4" and "0.4" for SCSIa, SCSIb and SCSIc, the "distribution rates" of storage devices 1805*a*, 1805*b*, and 1805*c*, respectively.

Next, referring to the flow chart shown in the FIG. 8, operations of the present system will be described in detail.

As described in the first embodiment, the external device outputs a file creating request including "specified block size" and data.

The destination determining part 1803 receives the file creating request from the external device (step S2501), and extracts the "specified block size" therein and latches it.

Next, the destination determining part 1803 fetches the first identifiers and the information about the number of storage devices from the configuration managing part 1801 to recognize the configuration of the storage devices to be managed, and further fetches the "distribution rates" (step S2502).

Specifically, when the present system manages the plural storage devices as shown in FIG. 2, the destination determining part 1803 recognizes the storage devices to be managed in step S2502 in the same manner as in step S2002 shown in FIG. 3. And the destination determining part 1803 fetches "0.2", "0.4", and "0.4" as the "distribution rates" for the SCSI addresses SCSIa, SCSIb, and SCSIc, respectively.

Next, the destination determining part 1803 initializes the counting part as described in the first embodiment (step S2503).

Next, in order to select the storage devices as destinations of data, the destination determining part 1803 sets the computed destination values based on the information about the number of storage devices and the first identifiers fetched in step S2502. Also, the destination determining part 1803 sets the computed destination values to "0" as the default values thereof (step S2504).

Specifically, when three first identifiers SCSIa, SCSIb, and SCSIc are fetched as described above, the destination determining part 1803 sets the computed destination values therefor to "0".

Next, the destination determining part 1803 adds the corresponding "distribution rates" to the present indicated values of the computed destination values (step S2505).

Specifically, when the computed destination values for SCSIa, SCSIb, and SCSIc are respectively set to "0", the destination determining part 1803 adds "0.2", "0.4" and "0.4" to "0" as each of the present values of the computed destination values.

Next, the destination determining part 1803 judges whether the present values of the computed destination values indicate "1.0" or higher, or not (step S2506). When all of the present values indicate lower than "1.0", the destination determining part 1803 proceeds to step S2505. When, on the other hand, at least one of the present values is equal to "1.0" or higher, the destination determining part 1803 proceeds to step S2507. That is, the destination determining part 1803 adds the "distribution rates" to each of the present values of the computed destination values in step S2505 until at least one of the present values indicates "1.0" or higher in step S2506.

In step S2507, the destination determining part 1803 subtracts "1.0" from the present values of the computed destination values indicating "1.0" or higher, and selects the storage devices specified by the first identifiers corresponding to the present values subjected to such subtraction as the storage devices which the empty-block addresses should be fetched from (step S2507).

Here, FIG. 9 shows changes in the computed values for SCSIa to SCSIc when steps S2505 and S2506 are executed repeatedly, and shows the storage devices 1805 to be selected in step S2507.

As shown in FIG. 9, the "distribution rate" "0.2" is added to the present value of the computed destination value for the first identifier SCSIa every time step S2505 is executed. Therefore, the present value changes as "0"→"0.2"→"0.4"→"0.6" . . . . In the same manner, since the "distribution rate" "0.4" is added to each of the present values of the computed destination values for the first identifiers SCSIb and SCSIc, the present value changes as "0"→"0.4"→"0.8"→"1.2". . . .

When the present values of the computed destination values for the first identifiers SCSIb and SCSIc reach "1.2", the destination determining part 1803 proceeds to step S2507, and subtracts "1.0" from "1.2", and sets the present values at "0.2" (see the values indicated by ○ shown in FIG. 9). The destination determining part 1803 selects the storage devices 1805*b* and 1805*c* provided with the first identifiers SCSIb and SCSIc, respectively, the present values of which have been set at "0.2", as the storage devices which empty-block addresses should be fetched from.

Referring back to FIG. 8, after step S2507, the destination determining part 1803 fetches one empty-block address for each of the first identifiers selected in step S2507 from the empty area managing part 1802 (step S2508).

Specifically, the destination determining part 1803 selects the first identifiers SCSIb and SCSIc as described above, and fetches the empty-block address "1" for each of the first identifiers.

Next, the destination determining part 1803 executes the same operations as in step S2005 of FIG. 3, and collects one of the first identifiers and the empty-block address for this identifier as a set, and then rearranges the sets at random as many as the SCSI addresses, and manages a permutation of the sets as a part of an address position file (step S2509).

Specifically, when the destination determining part 1803 fetches the empty-block address "1" for each of the SCSI addresses SCSIb and SCSIc as described above, the destination determining part 1803 creates sets of the SCSI addresses and the empty-block addresses (SCSIb;1) and (SCSIc;1) instep S2509, and rearranges these sets at random. Then the permutation of the sets [(SCSIb;1), (SCSIc;1)] is determined as an address position file (see column (a) in FIG. 10).

Next, the destination determining part 1803, after incrementing the value of the counting part by the number corresponding to the fetched empty-blocks in step S2508, compares the present value with the "specified block size" (step S2510). When the present value is smaller than the "specified block size", the destination determining part 1803 executes a loop (steps S2505 to S2510) again. On the other hand, when the present value is equal to the "specified block size" or larger, the destination determining part 1803 ends the operations according to the flow chart shown in FIG. 8.

Specifically, the destination determining part 1803, when fetching two empty-block addresses as described above, increments the value of the counting part by "2", the number of empty-block addresses. Assuming that the present value of the counting part "2" is smaller than the "specified block size", the destination determining part 1803 executes the loop (steps S2505 to S2510) again. In this loop, the destination determining part 1803 repeatedly executes S2505 and S2506, and the present value of the computed destination value for the SCSI address SCSIa changes as "0.6"→"0.8"→"1.0". The present values of the computed destination values for the SCSI address SCSIb and SCSIc change as "0.2"→"0.6"→"1.0" (see FIG. 9). Here, since all of the present values of the computed destination values show "1.0" simultaneously, the destination determining part 1803 proceeds to step S2507 to subtract "1.0" from "1.0", all of the present values, and sets all of the present values of the computed destination values at "0.0" (see the values indicated by ● shown in FIG. 9). Thereby, the storage devices 1805*a* to 1805*c* are selected as the storage devices which empty-block addresses should be fetched from.

Specifically, the destination determining part 1803 fetches the empty-block addresses "1", "2", and "2" for the SCSI addresses SCSIa, SCSIb, and SCSIc, respectively, in step S2508.

The destination determining part 1803 creates sets (SCSIa;1), (SCSIb;2) and (SCSIc;2) in step S2509, and rearranges these sets at random. Here, it is assumed that a permutation of the sets [(SCSIb;2), (SCSIa;1), (SCSIc;2)] is determined as the address position file (see column (b) in FIG. 10). Then, in step S2510, the destination determining part 1803 increments the value of the counting part by "3", the number of empty-block addresses, and compares the present value "5" with the "specified block size". In this way, the destination determining part 1803 executes the loop (steps S2505–S2510) repeatedly until the present value of the counting part reaches the "specified block size" or larger.

Here, a first address position file 2701 in FIG. 10 is created according to the above-described embodiment. FIG. 10 also shows a second address position file 2702 which the destination determining part 1803 creates after accepting another file creating request. It is noted that the second address position file 2702 is created in the same manner as discussed above for the first address position file 2701. These address position files 2701 and 2702 have the same configuration as described in the first embodiment so that the storage device control unit 1804 can uniquely understand the address positions of the storage devices into which data-blocks composing the data are to be written.

The storage device control unit 1804 writes data-blocks into the storage devices 1805 according to the address position files as described in the first embodiment. Thus, the data-blocks are distributed to the plural storage devices.

As described above, the present system creates the address position files not to equalize the number of data-blocks distributed to each of the storage devices as described in the first embodiment, but to equalize the burden of operations on each of the storage devices using "distribution rates". That is, for example, in a case in which the bandwidth, the capacity, and other performances of each of the storage devices 1805 are not equal, when the number of data-blocks distributed to each of the storage devices is equalized, the burden of operations on some of the storage devices, whose performance is inferior to that of the rest (hereinafter, the "first storage devices"), is greater than the burden on the other storage devices whose performance is superior to that of the first storage devices (hereinafter, the "second storage devices"). As a result, the performance of the second storage devices is restricted by the performance of the first storage devices, and the present system is not able to fully utilize the maximum performance of the second storage devices.

However, in the present system, it is possible that the number of data-blocks to be written into the first storage devices is relatively smaller than the number of data-blocks to be written into the second storage devices to equalize the burden of operations on the first storage devices to that on the second storage devices. The present system can thereby make effective use of the maximum performance of all storage devices and retrieve larger volumes of data from the whole storage devices in a unit of time.

Although the "distribution rates" used in the present system are managed by the configuration managing part 1801 in advance in the above description, the "distribution rates" may be given to the destination determining part 1803 as parameters. The destination determining part 1803 may execute the operations according to the flow chart shown in FIG. 8 using the "distribution rates" found by executing the algorithm.

Next, the storage device management system according to a fourth embodiment of the present invention (hereinafter, "the present system") will be described.

Because the configuration of the present system and the embodiment of the storage devices to be managed by the present system and other devices are the same as shown in FIGS. 1 and 5, their schematic representation and brief description will be omitted, and the same reference numbers as used in FIGS. 1 and 5 will also be used in the description below. However, since the information managed by the configuration managing part 1801 and the empty area managing part 1802 of the present system, and the operation process executed by the destination determining part 1803 are different from those described in the previous embodiments, the difference will be described in detail.

The configuration managing part 1801 stores the information about the number of storage devices, the information about the number of groups of the storage devices, and first and second identifiers, as described in the second embodiment, and moreover, stores first and second "distribution rates".

Figure 11:
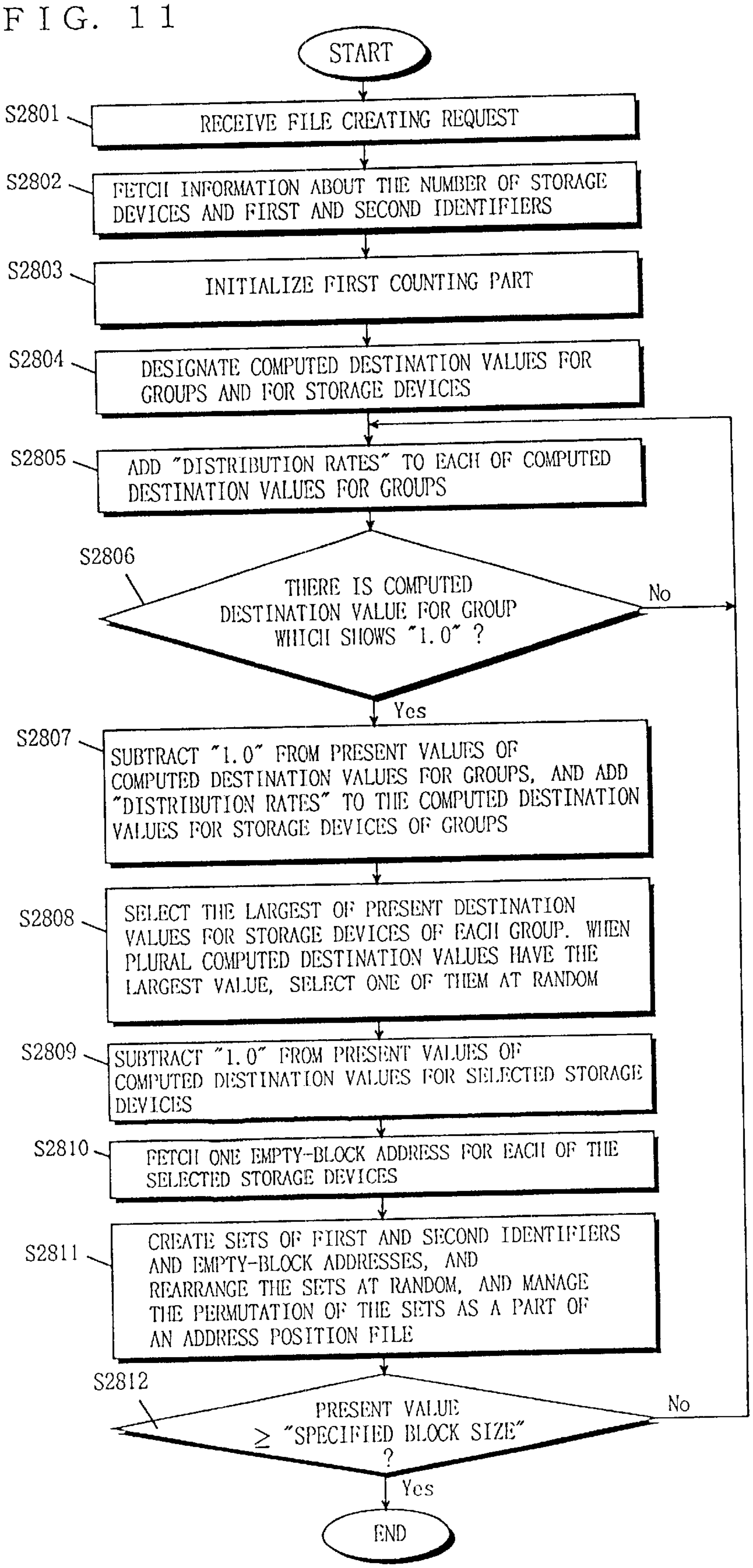
FIG. 11 is a flowchart showing the procedure of the destination determining part 1803 according to the fourth embodiment.

The destination determining part 1803 executes operations according to a flow chart shown in FIG. 11, and, taking into consideration the first and second "distribution rates", determines destinations of data-blocks using the first and second identifiers and the empty-block addresses.

Here, the first and second "distribution rates" will be described.

The first "distribution rates" are almost the same as "distribution rates" described in the third embodiment.

However, although the "distribution rates" described in the third embodiment show rates with respect to all storage devices, the first "distribution rates" described in the present embodiment show rates with respect to only the storage devices in the same group. Since there are no other differences than that difference, a detailed explanation about the first "distribution rates" will be omitted.

Next, the second "distribution rates" will be described. Assume that the storage devices of each group is considered as one storage device. The second "distribution rate" is the rate of the number of data-blocks distributed to each storage device which is composed of the storage devices of the same group, which is obtained by using the bandwidth and/or capacity of the arranged storage device. That is, when the data-blocks are distributed to plural groups, the second "distribution rate" means the rate of the number of data-blocks distributed to each group.

Plural storage devices of each of the groups are collected in one storage device as described below.

First, the first "distribution rate" of each storage device of the same group is found as described in the third embodiment (see the explanation about the methods (a) to (c) in the third embodiment). Next, the bandwidth and the capacity are each multiplied by the reciprocal of the first "distribution rate", and the obtained values are regarded as an effective bandwidth and an effective capacity. Also, among the values of the effective bandwidth and capacity of all storage devices of the same group, the minimum values are regarded as the bandwidth and capacity of the storage device which is composed of the storage devices of the same group. The second "distribution rate" is found by using the bandwidth and capacity of the storage device which is composed of the storage devices of the group in the same way as described about the methods (a) to (c) in the third embodiment.

Specifically, it is assumed that the bandwidth and capacity of the storage devices 1807*a*, 1807*b*, and 1807*c* are 1 Mbps and 2 GB; 2 Mbps and 2 GB; and 3 Mbps and 4 GB, respectively. It is assumed that the first "distribution rates" of the storage devices 1807*a*, 1807*b*, and 1807*c* are found as "1/5", "3/10", and "1/2", respectively. Here, the effective bandwidth and effective capacity of the storage devices 1807*a*, 1807*b*, and 1807*c* are found as 5 Mbps and 10 GB; 20/3 Mbps and 20/3 GB; and 30 Mbps and 40 GB, respectively. Therefore, when the storage devices 1807*a*, 1807*b*, and 1807*c* are collected in one storage device, the bandwidth and capacity of the storage device (the group 1), which is composed of the storage devices 1807*a*, 1807*b*, and 1807*c*, are 5 Mbps and 20/3 GB. In the same manner, the bandwidth and capacity of the storage device (the group 2), which is composed of the storage devices 1807*d*, 1807*e*, and 1807*f*, are 5 Mbps and 10 GB. Here, when the second "distribution rates" are found by the method (a) in the third embodiment, the second "distribution rates" of the group 1 and the group 2 are "0.5" each.

Next, referring to a flow chart shown in FIG. 11, operations of the present system will be described in detail.

As described in the first embodiment, an external device outputs a file creating request including "specified block size" and data.

The destination determining part 1803 receives the file creating request from the external device (step S2801), and extracts the "specified block size" included in the file creating request, and latches it.

Next, the destination determining part 1803 fetches the first and second identifiers, the information about the number of storage devices, and the information about the number of groups of the storage devices from the configuration managing part 1801, and recognizes the configuration of the storage devices to be managed based on the fetched information, and moreover, fetches the first and the second "distribution rates" (step S2802).

Specifically, when the present system manages plural storage devices as shown in FIG. 5, the destination determining part 1803 fetches "6" as the number of storage devices, and "2" as the number of groups in step S2802. The destination determining part 1803 also fetches the second identifier MSFS1, "0.5" which is the second "distribution rate" of the group 1, the first identifiers SCSIa to SCSIc of the group 1, and "0.2", "0.4" and "0.4" which are the first distribution rates for the first identifiers SCSIa, SCSIb, and SCSIc, respectively. The destination determining part 1803 executes the same operations also for the group 2 specified by the second identifier MSFS2.

Next, the destination determining part 1803 initializes the counting part as described in the first embodiment (step S2803).

Next, the destination determining part 1803, in order to select the storage devices as destinations of data, sets the computed destination values of the groups and of the storage devices as many as the total number of the groups and the storage devices, based on the second and first identifiers fetched in step S2802, and sets the present values of the computed destination values at "0" (step S2804).

Specifically, the destination determining part 1803 fetches the first identifiers SCSIa to SCSIc for each of the second identifiers MSFS1 and MSFS2 as described above, and sets at "0" the present values of the computed destination values for the groups in relation to the second identifiers MSFS1 and MSFS2, and also sets at "0" the present values of the computed destination values for the storage devices in relation to the first identifiers SCSIa to SCSIc of each group (see FIG. 12).

Next, with the operation in step S2804, the destination determining part 1803 adds the second "distribution rate" corresponding to the present value for the computed destination value for each of the groups (step S2805).

Specifically, the destination determining part 1803, when setting at "0" the present value of the computed destination value for the groups in relation to each of the second identifiers MSFS1 and MSFS2 as described above, adds "0.5", which is the second "distribution rate" of each second identifier, to "0", which is the present value of the computed value.

Next, the destination determining part 1803 judges whether either of the present values of the computed destination value for the groups is "1.0" or higher (step S2806). When all of the present values of the computed destination values are lower than "1.0", the destination determining part 1803 proceeds to step S2805. On the other hand, when any of the present values of the groups is "1.0" or higher, the destination determining part 1803 proceeds to step S2807. That is, the destination determining part 1803 repeatedly adds the second "distribution rates" to the present values of the computed destination values for the groups in step S2805 until at least one of the present values reaches "1.0" or higher.

The destination determining part 1803, in step S2807, subtracts "1.0" from the present values of the computed destination values for the groups showing "1.0" or higher. Then, the destination determining part 1803 adds the first "distribution rates" corresponding to the present values for the computed destination values of the storage devices of these groups. That is, the destination determining part 1803, in step S2806, selects the groups of the storage devices which empty-block addresses should be fetched from.

The destination determining part 1803, when selecting the second identifiers MSFS1 and MSFS2 as described above, adds "0.2", which is the first "distribution rate", to "0", which is the present value of the computed destination value for the storage device of the first identifier SCSIa determined corresponding to MSFS1 and MSFS2. In the same manner, the destination determining part 1803 adds "0.4", which is the "distribution rate", to "0", which is the present value for the computed destination value for each of SCSIb and SCSIc.

Next, the destination determining part 1803 selects the largest present value of the computed destination values for the storage devices of each group, and selects the storage device corresponding to the value as the storage device which empty-block addresses should be fetched from. When there are plural storage devices of the same group showing the largest present value, the destination determining part 1803 selects one of the storage devices at random as the storage device which empty-block addresses should be fetched from (step S2808).

Next, the destination determining part 1803 subtracts "1.0" from the present values of the computed destination values for the storage devices selected in step S2808 (step S2809).

Here, FIG. 12 shows changes in the computed destination value for the groups and the storage devices when the destination determining part 1803 executes the above-described operations repeatedly, and also shows the storage devices 1807 to be selected in step S2808.

In FIG. 12, since the second "distribution rate" "0.5" is added to the present values of the computed destination values for the groups provided with the second identifiers MSFS1 and MSFS2 every time step S2805 is executed, the present value changes as "0"→"0.5"→"1.0". When the present values for the computed destination values of the groups provided with the second identifiers MSFS1 and MSFS2 reach "1.0", the destination determining part 1803 proceeds to step S2807 to subtract "1.0" from "1.0" which is the present values, and sets at "0.0" the present values of the computed destination values for the groups (see the values indicated by ○ shown in FIG. 12). Thereby, the group 1 and the group 2 are selected as the groups which empty-block addresses should be fetched from.

Next, the destination determining part 1803 adds "0.2", "0.4", and "0.4", which are the first "distribution rates", to "0", which is the present values of the computed destination values of the storage devices provided with the first identifiers SCSIa, SCSIb, and SCSIc of the group 1, respectively, as described above. The destination determining part 1803 executes the same operations for the storage devices of the group 2.

Then, the destination determining part 1803 executes step S2808, and, here, the present values of the computed destination values of the storage devices provided with the first identifiers SCSIb and SCSIc of the group 1 are the largest. Therefore, the destination determining part 1803 selects at random one of the present values of the computed destination values. Here, it is assumed that the storage device 1807*b* (the first identifier SCSIb) is selected as the storage device which empty-block addresses should be fetched from. The destination determining part 1803 executes the same operations also for the group 2, and it is assumed that the storage device 1807*f* (the first identifier SCSIc) is selected as the storage device which empty-blocks address should be fetched from (see the part indicated by ● shown in FIG. 12).

Then, the destination determining part 1803 executes step S2809, subtracting "1.0" from "0.4", which is the present value of the computed destination values for the storage device 1807*b* provided with the second identifier MSFS1 and the first identifier SCSIb, and also subtracting "1.0" from "0.4", which is the present value for the storage device 1807*f* provided with the second identifier MSFS2 and the first identifier SCSIc. The present values of the computed destination values of the storage device 1807*b* and 1807*f* are thus set at "−0.6".

Referring back to FIG. 11, the destination determining part 1803, in step S2810, fetches one empty-block address for each of the storage devices (specified by the second and the first identifiers) selected in step S2808 from the empty area managing part 1802 (step S2810).

The destination determining part 1803, when selecting the first identifier SCSIb for the second identifier MSFS1, and the first identifier SCSIc for the second identifier MSFS2, fetches the empty-block address "1" for each of the first identifier.

Next, the destination determining part 1803 collects one of the second identifiers, one of the first identifiers, and the empty-block address for these second and first identifiers into one set, and rearranges, at random, as many sets as the groups, and the permutation of the sets is managed as a part of one address position file (step S2811).

The destination determining part 1803, when fetching the empty-block address "1" for the second identifier MSFS1, the first identifier SCSIb, the second identifier MSFS2, and the first identifier SCSIc, creates sets (MSFSS1;SCSIb;1) and (MSFS2;SCSIc;1), and rearranges the sets at random, and a permutation [(MSFS1;SCSIb;1), (MSFS2;SCSIc;1)] is determined as a part of an address position file (see column (a) in FIG. 13).

Next, the destination determining part 1803, after incrementing the value of the counting part by the number corresponding to fetched empty-blocks in step S2810, compares the present value of the counting part with the "specified block size" (step S2812). When the present value is smaller than the "specified block size", the destination determining part 1803 executes a loop (steps S2805 to S2812) again. On the other hand, when the present value is the "specified block size" or larger, the destination determining part 1803 ends the operations according to the flow chart of FIG. 11.

A first address position file 3001 as shown in FIG. 13 is created according the above-described embodiment. FIG. 13 also shows a second address position file 3002 which the destination determining part 1803 creates after accepting another file creating request. It is noted that the second address position file 3002 is created in the same manner as discussed above for the first address position file 3001.

As described above, the present system creates address position files so as not to distribute data-blocks equally to each of the groups and to storage devices of each of the groups, but to equalize the burden of operations on each of the groups and also on each of the storage devices of the groups using the first and the second "distribution rates". Thereby, when data is read, access does not concentrate on the storage devices of specific groups or specific storage devices of each of the groups. Moreover, the burden of operations on each of the groups and the storage devices is equal. It is therefore possible to retrieve a larger volume of data from the whole storage devices in a unit of time.

Although the first and the second "distribution rates" used in the present system are managed by the configuration managing part 1801 in advance, the first and the second "distribution rates" can be given to the destination determining part 1803 as parameters. Also, the destination determining part 1803 may execute the operations according to the flow chart shown in FIG. 11 using the first and the second "distribution rates" found by executing a prescribed algorithm.

Next, the storage device management system according to a fifth embodiment of the present invention (hereinafter, "the present system") will be described below.

Figure 14:
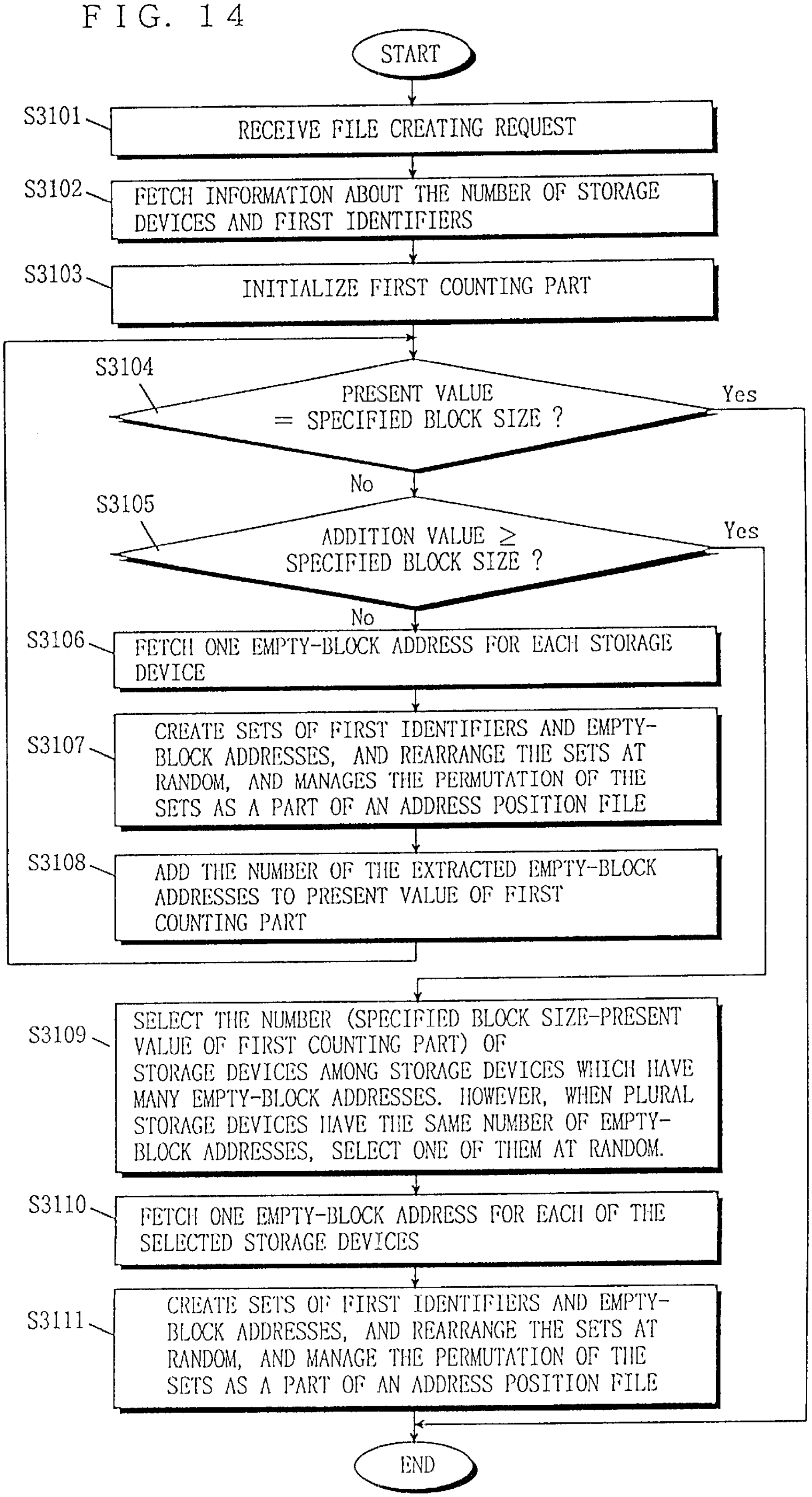
FIG. 14 is a flowchart showing the procedure of the destination determining part 1803 according to the fifth embodiment.

Since the configuration of the present system and the embodiment of the storage devices to be managed by the present system and other devices are the same as shown in FIGS. 1 and 2, their schematic representation and brief description will be omitted, and the same reference operation process executed by the destination determining part 1803 of the present system follows the flow chart shown in FIG. 14. Since the information managed by the configuration managing part 1801 and the empty area managing part 1802 is the same as described in the first embodiment, its description will be omitted.

Referring to a flow chart shown in FIG. 14, the operations of the present system will be described below.

As described in the first embodiment, an external device outputs a file creating request including "specified block size" and data. The case in which the "specified block size" is "4" will be described below.

Like the operations in steps S2001 to S2003 in FIG. 3, the destination determining part 1803 receives the file creating request (step S3101), and extracts the "specified block size" included in the file creating request and latches it.

Next, the destination determining part 1803 fetches first identifiers and the information about the number of storage devices from the configuration managing part 1801 (step S3102).

For example, when the present system manages plural storage devices as described in FIG. 2, the destination determining part 1803 fetches "3" as the number of storage devices, and the first identifiers SCSIa to SCSIc in step S3102.

Next, the destination determining part 1803 initializes the counting part as described in the first embodiment (step S3103).

Next, the destination determining part 1803 judges whether the present value of the counting part is the same as the "specified block size" (step S3104), and the destination determining part 1803, when judging that both are not the same, proceeds to step S3105. On the other hand, the destination determining part 1803, when judging that both are the same, recognizes that the address position files corresponding to the "specified block size" have been created, and ends the operations according to the flow chart shown in FIG. 14.

When the "specified block size" which the destination determining part 1803 latches at present is "4", the destination determining part 1803 compares "4" with "0", which is the present value of the counting part. Here, since both are not the same, the destination determining part 1803 proceeds to step S3105.

The destination determining part 1803, in step S3105, compares the "specified block size" with the addition value, which is found by adding the number of empty-block addresses to be fetched in the following step S3106 (this number is specified by the number of storage devices) to the present value of the counting part (step S3105). When the addition value is smaller than the "specified block size", the destination determining part 1803 judges that it needs to fetch the empty-block addresses as many as the number of storage devices, and proceeds to step S3106. On the other hand, when the addition value is the same as the "specified block size" or larger, the destination determining part 1803 judges that, when the empty-block addresses as many as the number of storage devices are fetched, some of the empty-block addresses are left over, and proceeds to step S3109.

When the "specified block size" which the destination determining part 1803 latches at present is "4", the present value of the counting part is "0" and the number of storage devices is "3", the destination determining part 1803 compares "0+3" which is the addition value with "4" which is the "specified block size". In this case, since the addition value is smaller than the "specified block size", the destination determining part 1803 proceeds to step S3106.

In step S3106,the destination determining part 1803 fetches one empty-block address for each of the first identifiers fetched in step S3102 from the empty area managing part 1802.

Specifically, when fetching the first identifiers SCSIa to SCSIc as described above, the destination determining part 1803 fetches "1" as the respective empty-block addresses corresponding to each of the first identifiers in step S3106.

Next, the destination determining part 1803 executes the same operations as in step S2005 shown in FIG. 3, creates sets of the first identifiers and empty-block addresses for these identifiers fetched in step S3106, rearranges the sets at random, and manages the permutation of the rearranged sets as a part of an address position file (step S3107).

As described above, the destination determining part 1803, after fetching the empty-block address "1" for each of the first identifiers SCSIa to SCSIc, creates the sets (SCSIa;1), (SCSIb;1) and (SCSIc;1) in step S3107, and rearranges these three sets at random. Here, it is assumed that a permutation of the sets [(SCSIb;1), (SCSIa;1), (SCSIc;1)] is determined as an address position file (see column (a) in FIG. 15).

Next, the destination determining part 1803 increments the value of the counting part by the number corresponding to fetched empty-blocks in step S3106 (step S3108), and proceeds to step S3104.

The destination determining part 1803 fetches three empty-block addresses as described above, and increments the value of the counting part by "3", which is the number of empty-block addresses.

The above-described steps S3104 to S3108 forms a loop, and the loop is repeatedly executed until the destination determining part 1803 judges in step S3104 that the present value of the counting part is the same as the "specified block size" or until the destination determining part 1803 judges in step S3104 that the present value is not the same as the "specified block size" and at the same time judges in step S3105 that the addition value is larger than the "specified block size".

The destination determining part 1803, after incrementing the present value of the counting part by "3", executes step S3104, and then proceeds to step S3105. Here, since the addition value "6", which is found by adding "3", which is the number of empty-block addresses to be fetched in step S3106, to "3", which is the present value of the counting part, is larger than the "specified block size" "4", the destination determining part 1803 proceeds to step S3109.

First, the destination determining part 1803 executes the following calculation (4) in step S3109.

(The "specified block size"–the count value of the counting part) (4)

Then, referring to the empty area managing part 1802, the destination determining part 1803 obtains the number of empty-block addresses included in each storage device at present, and the first identifiers. The destination determining part 1803 rearranges the first identifiers in an order of decreasing numbers of empty-block addresses obtained, and selects the first identifiers according to the order. The destination determining part 1803 executes this selecting operation until the value found by the calculation (4) and the number of selected first identifiers become the same. Here, during the above-described selecting operation, there is a case in which some storage devices have the same number of empty-block addresses. In this case, the destination determining part 1803 selects at random one of the first identifiers indicating the storage devices which have the same number of empty-block addresses (step S3109).

When the "specified block size" is "4" and the present value of the counting part is "3", as described above, the destination determining part 1803 obtains "1" by the calculation (4) in step S3109, and then recognizes that the storage devices 1805*a* to 1805*c* presently each have 999 empty-block addresses. Here, since "3", which is the number of storage devices having the same number of empty-block addresses, is larger than "1", which is the value found by the calculation (4), the destination determining part 1803 selects at random one of the first identifiers SCSIa to SCSIc. Here, assume that the first identifier SCSIa is selected.

Next, the destination determining part 1803 fetches one empty-block address for each of the first identifiers selected in step S3109 from the empty area managing part 1802 (step S3110).

Specifically, the destination determining part 1803 selects the first identifier SCSIa as described above, and fetches the empty-block address "2" for the first identifier SCSIa in step S3110.

Next, the destination determining part 1803 creates sets of the first identifiers selected in step S3109 and the empty-block address for these first identifiers, rearranges the sets at random, and manages the permutation of the sets as a part of an address position file (step S3111).

The destination determining part 1803, when fetching the empty-block address "2" for the first identifier SCSIa as described above, creates a set (SCSIa;2) in step S3110. Here, the destination determining part 1803 manages the set as a part of the address position file (see column (b) in FIG. 15).

Figure 15:
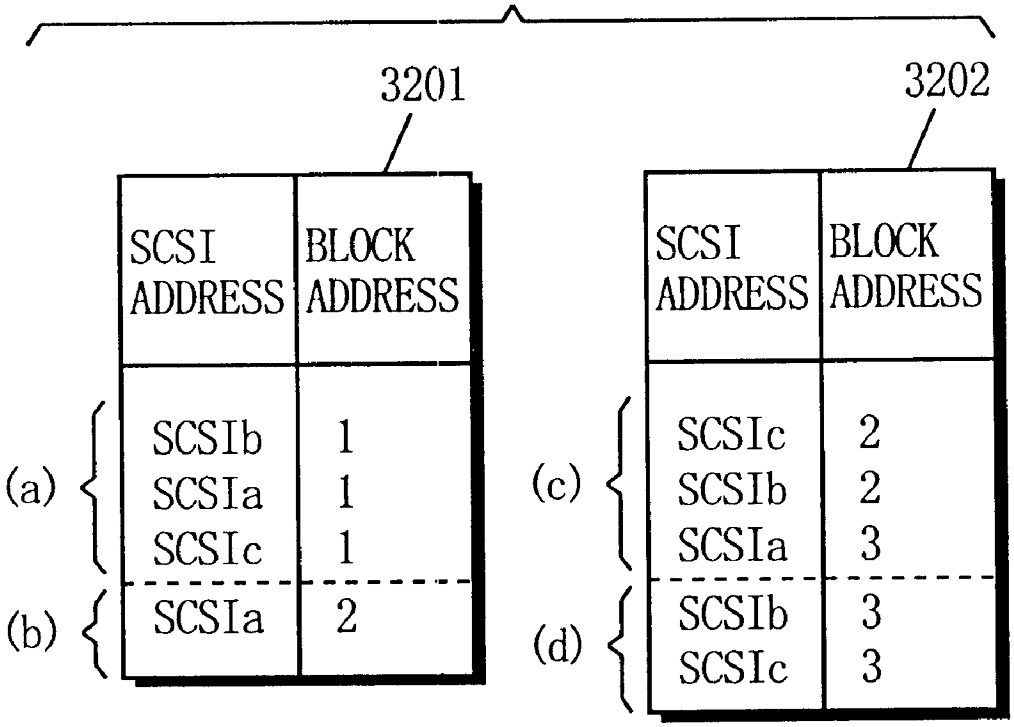
FIG. 15 is a flowchart showing one example of an address position file created by the destination determining part 1803 according to the fifth embodiment.

Here, a first address position file 3201 in FIG. 15 is created according to the above-described operations. FIG. 15 also shows a second address position file 3202. The second address position file 3202 is created after the fist address position file 3201 by the destination determining part 1803 in response to another file creating request. These first and second address position files have the same configuration as described in the first embodiment, allowing the storage devices to uniquely recognize the destinations of data-blocks.

The storage device control unit 1804 receives the address position files determined as described above, and writes data-blocks into which data is divided, into the storage devices according to the address position files as described in the first embodiment.

Here, the process to create the second address position file 3202 will be described. As described above, the destination determining part 1803, after creating the first address position file 3201, receives another file creating request (step S3101). This file creating request includes the "specified block size" "5". The destination determining part 1803, after executing steps S3102 and S3103, executes the loop (steps S3104 to S3108) just once as in the case of creating the first address position file 3201. By executing the loop, the destination determining part 1803 determines [(SCSIc;2), (SCSIb;2), (SCSIa;3)] as an address position file (see column (c) in FIG. 15).

The destination determining part 1803 creates the first part of the second address position file 3202 in step S3107, and, after incrementing the present value of the counting part by "3", executes step S3104, and proceeds to step S3105.

Here, since the addition value "6", found by adding "3", which is the number of empty-block addresses to be fetched in step S3106 to "3", which is the present value of the counting part, is larger than the "specified block size" "5", the destination determining part 1803 proceeds to step S3109.

Next, the destination determining part 1803 obtains "2" by the above-described calculation (4), and recognizes that the storage devices 1805*a*, 1805*b*, and 1805*c* presently have 997, 998, and 998 empty blocks, respectively. Therefore, the destination determining part 1803 selects the storage devices 1805*b* and 1805*c* specified by SCSIb and SCSIc, respectively, as the storage devices from which empty-block addresses should be fetched (step S3109). Here, the destination determining part 1803 fetches the empty-block address "3" for SCSIb and SCSIc (step S3110). Next, the destination determining part 1803 creates sets (SCSIb;3) and (SCSIc;3), and rearranges the sets at random. Here, [(SCSIb;3), (SCSIc;3)] is determined as an address position file (see column (d) in FIG. 15).

The number of data-blocks composing the distributed data is not always the multiples of the number of storage devices. As a result, the systems according to the previous embodiments have a possibility that they will not be able to distribute data equally to all storage devices. Therefore, the system according to the present embodiment creates address position files so as to distribute the remainder of data-blocks (the remainder of the number of data-blocks divided by the number of storage devices) to the storage device which presently has the most empty blocks. Thereby, data is distributed equally to all storage devices. Moreover, even compared with the systems according to the previous embodiments, the system according to the present embodiment can retrieve a larger volume of data from the whole storage devices in a unit of time.

Next, the storage device management system according to a sixth embodiment of the present invention (hereinafter, "the present system") will be described. Since the configuration of the present system and the embodiment of the storage devices to be managed by the present system and other devices are the same as shown in FIGS. 1 and 2, their schematic representation and brief description will be omitted, and the same numbers as used in FIGS. 1 and 2 are also used in the description below. However, the operation process of the destination determining part 1803 follows a flow chart shown in FIG. 16. Since the information stored by the configuration managing part 1801 and the empty area managing part 1802 is the same as described in the first embodiment, its description will be omitted.

Figure 16:
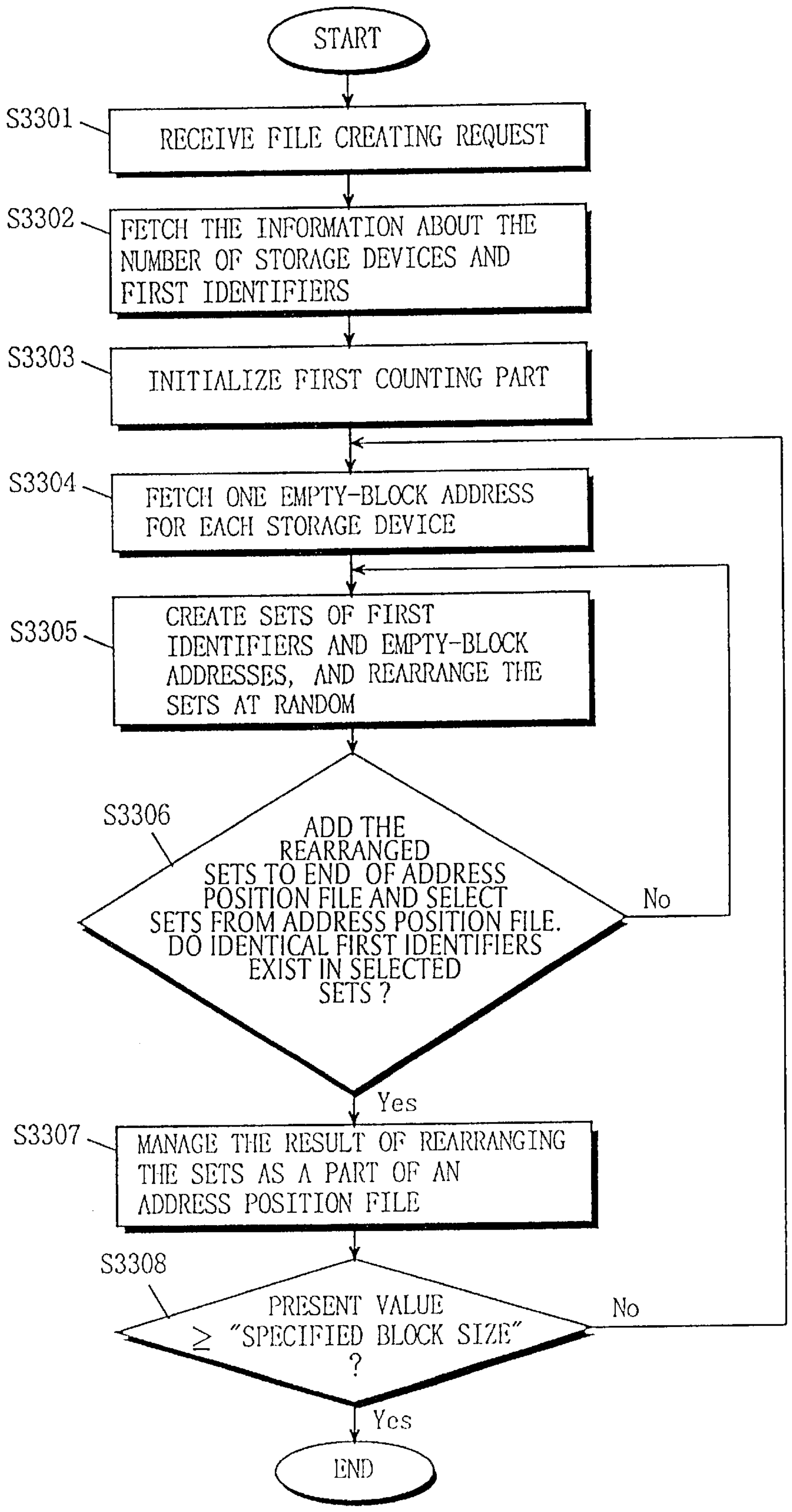
FIG. 16 is a flowchart showing the procedure of the destination determining part 1803 according to the sixth embodiment.

Referring to the flow chart shown in FIG. 16, the operations of the present system will be described in detail below.

As described in the first embodiment, an external device outputs a file creating request including "specified block size" and data.

Like the operations of steps S2001 to S2003 shown in FIG. 3, the destination determining part 1803 receives the file creating request (step S3301), and extracts the "specified block size" included by the file creating request, and latches it.

Next, the destination determining part 1803 fetches first identifiers and the information about the number of storage devices (step S3302).

Specifically, when the present system manages plural storage devices as shown in FIG. 2, the destination determining part 1803 fetches "3", the number of storage devices, and the first identifiers SCSIa to SCSIc in step S3302.

Next, the destination determining part 1803 initializes the counting part as described in the first embodiment (step S3303).

Next, the destination determining part 1803 fetches one empty-block address for each of the first identifiers fetched in step S3302 from the empty area managing part 1802, and creates sets of the first identifiers and the empty-block addresses for these first identifiers (step S3304).

Specifically, when fetching the first identifiers SCSIa to SCSIc as described above, the destination determining part 1803 fetches "10" as the empty-block address for the respective first identifiers in step S3304, and creates sets as (SCSIa;10), (SCSIb;10), and (SCSIc;10).

Next, the destination determining part 1803 rearranges at random the sets created in step S3304 (step S3305).

The destination determining part 1803, when creating the above-described sets in step S3304, rearranges the sets at random. Here, it is assumed that the result of rearranging the sets is [(SCSIb;10), (SCSIa;10), (SCSIc;10)].

In the next step S3306, the destination determining part 1803 first adds the sets rearranged in step S3305 to the end of the address position file stored in the previous loop (steps S3304 to S3308). Then, the destination determining part 1803 selects a plurality of sets satisfying predetermined conditions from the address position file. The selected sets are successive in the address position file, and the number of selected sets is smaller than the number of first identifiers included in the sets created in step S3305. The destination determining part 1803 then determines whether first identifiers identical to each other exist in the selected sets (step S3306). If first identifiers identical to each other do not exist, the destination determining part 1803 stores the address position file with the sets added thereto in step S3306. On the other hand, if first identifiers identical to each other do exist, the destination determining part 1803 returns to step S3305 for rearranging the plurality of sets each composed of the first identifier and the empty-block address.

For example, assume herein that the last three sets of the address position files stored in the previous loop (step S3304 to S3308) are [(SCSIa; 9), (SCSIc; 9), (SCSIb; 9)]. Also assume that after the step S3305 is executed, [(SCSIb; 10), (SCSIa; 10), (SCSIc; 10)] is obtained.

When step S3306 is executed under the above assumptions, the end portion of the address position file becomes [. . . , (SCSIa; 9), (SCSIc; 9), (SCSIb; 9), (SCSIb; 10), (SCSIa; 10), (SCSIc; 10)]. In such address position file, the destination determining part 1803 finds the first identifiers SCSIb identical to each other in two successive sets [. . . , (SCSIb; 9), (SCSIb; 10) . . . ]. In this case, the destination determining part 1803 returns to step S3305 for rearranging three sets (SCSIb; 10), (SCSIa; 10), and (SCSIc; 10) again. Assume herein that, in step S3305 this time, [(SCSIa; 10), (SCSIb; 10), (SCSIc; 10)] is obtained. When step S3306 is executed under this assumption, the end portion of the address position file becomes [. . . , (SCSIa; 9), (SCSIc; 9), (SCSIb; 9), (SCSIa; 10), (SCSIb; 10), (SCSIc; 10)]. In such address file, the destination determining part 1803 cannot find the first identifiers identical to each other in two successive sets. Therefore, the procedure goes to step S3307.

Next, the destination determining part 1803 manages the result of rearranging the sets in step S3305 as a part of the address position file (step S3307).

Next, the destination determining part 1803, after incrementing the present value of the counting part by the number of empty-block addresses fetched in step S3304, compares the present value with the "specified block size" (step S3308). When the present value of the counting part is smaller than the "specified block size", the destination determining part 1803 returns to step S3304, and executes the same operations as described above. On the other hand, when the present value is the same as the "specified block size" or larger, the destination determining part 1803 ends the operations.

The storage device control unit 1804 receives the determined address position file, as described above, and writes data-blocks into which data is divided, into the storage devices according to the address position file as described in the first embodiment.

The data-blocks are distributed equally to the storage devices according to the address position files created by the systems in the previous embodiments. However, if the address position file is created including the above-described two sets [. . . , (SCSIb; 9), (SCSIb; 10), . . . ], two data blocks are successively distributed to the storage device identified as SCSIb. To avoid this drawback, the system according to the present embodiment can check in step S3306 whether the first identifiers identical to each other exist in the selected sets. Thus, it is possible to prevent successive data blocks from being distributed to the same storage device. Thus, when data is read, accesses are made more equally to all storage devices. This leads to effects of making a more effective use of the performance of all storage devices and retrieving a larger volume of data from the whole storage devices in a unit of time.

Next, the storage device management system according to a seventh embodiment of the present invention (hereinafter, "the present system") will be described.

Since the configuration of the present system and the embodiment of the storage devices to be managed by the present system and other devices are the same as shown in FIGS. 1 and 2, their schematic representation and outlines will be omitted, and the same reference numbers as used in FIGS. 1 and 2 will also be used in the description below. However, the destination determining part 1803 of the present system is different from that described in the first embodiment, and has a predetermined look-up table which associates the bandwidth for data access with the number of empty-block addresses fetched from one storage device, and executes the operations according to a flow chart shown in FIG. 17. Since the other parts in the configuration of the present system are the same as described in the first embodiment, their description will be omitted.

Figure 17:
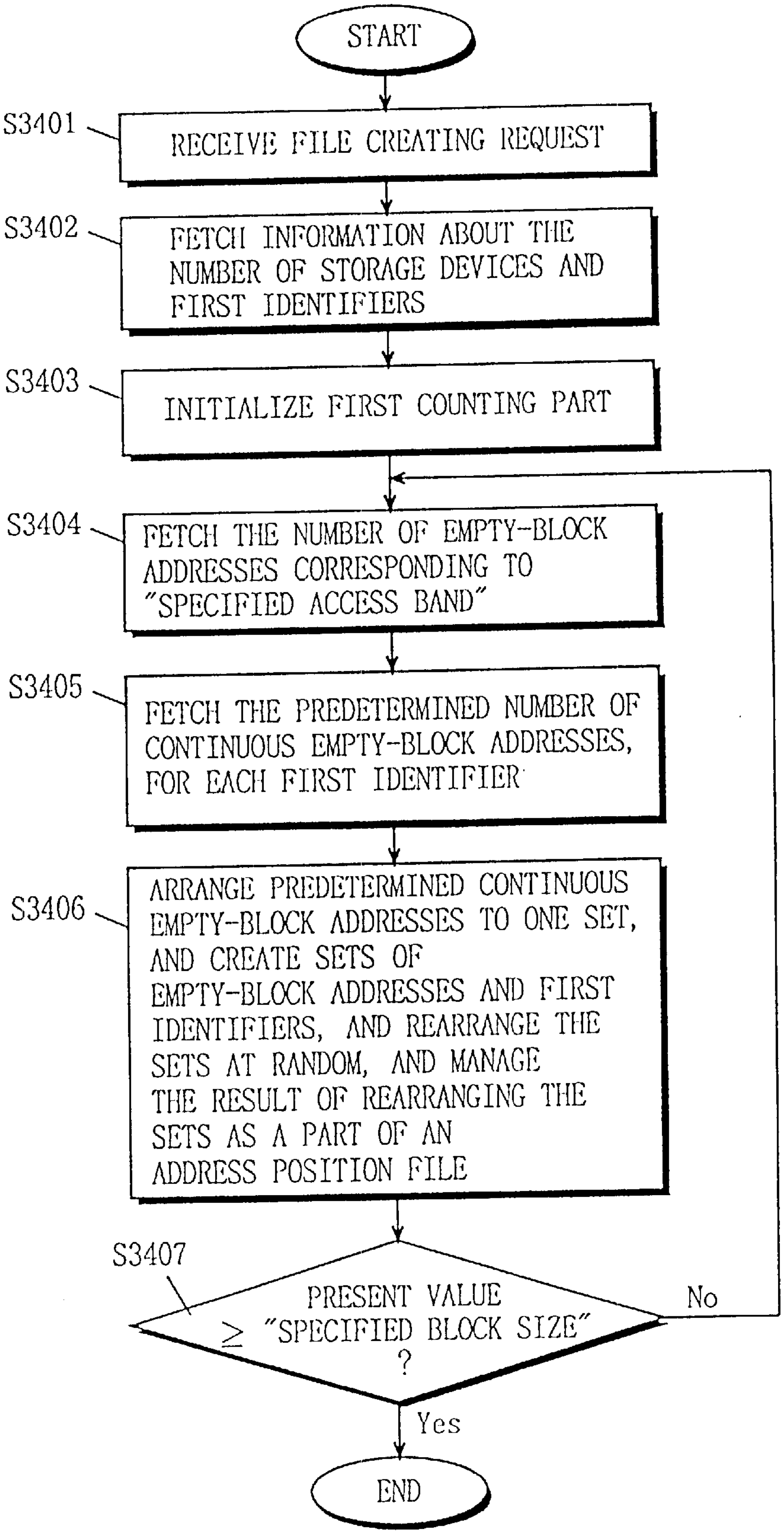
FIG. 17 is a flowchart showing the procedure of the destination determining part 1803 according to the seventh embodiment.

Referring to the flow chart of FIG. 17, which shows the operation procedure executed by the destination determining part 1803, operations of the present system will be described in detail below.

An external device outputs a file creating request and data as described in the first embodiment. The file creating request includes the above-described "specified block size" and the information for identifying the bandwidth which is necessary to make access to data (hereinafter, "specified access bandwidth"). As an example, a case in which the "specified access bandwidth" is 30 Mbps will be described below.

The destination determining part 1803 receives the file creating request (step S3401), and extracts and latches the "specified block size" and the "specified access data" included in the file creating request.

Next, the destination determining part 1803 fetches the information about the number of storage devices and the first identifiers (step S3402), and recognizes the configuration of the storage devices to be managed.

Specifically, when the present system manages plural storage devices as described in FIG. 2, the destination determining part 1803 fetches "3" as the number of storage devices, and the first identifiers SCSIa to SCSIc in step S3402.

Next, the destination determining part 1803 initializes the counting part as described in the first embodiment (step S3403).

Next, the destination determining part 1803 fetches the number of empty-block addresses corresponding to the "specified access bandwidth" presently held therein from the predetermined look-up table (step S3404).

For example, assume herein that, for the specified access bandwidths 1.5 Mbps, 10 Mbps, and 30 Mbps, the numbers of empty-block addresses fetched from one storage device are 1, 2, and 4, respectively. Thus, it is clear from the above discussion that, the larger the specified access bandwidth is, the more the number of empty-block addresses fetched becomes. The reason is as follows. In general, when compared per unit time, the number of times that access to the storage device having a larger bandwidth is required is higher than that of access to the storage device having a smaller bandwidth. Under these circumstances, data blocks can be more efficiently read if they are stored only in the successive storage areas of the magnetic disk in the storage device of a larger bandwidth.

The destination determining part 1803, when receiving the file creating request including the specified access bandwidth 30 Mbps as described above, fetches in step S3404 the number of empty-block addresses from the table.

Next, the destination determining part 1803 fetches a predetermined number of empty-block addresses in the storage device identified by the first identifier fetched in step S3402 (step S3405). The empty-block addresses fetched in step S3405 are equal in number to those fetched in step S3404 from the table, and indicate successive storage areas in the storage device.

Specifically, the destination determining part 1803, when fetching "4" from the table, fetches "1"–"4" as the four continuous empty-block addresses for the first identifiers SCSIa to SCSIc.

Next, the destination determining part 1803 collects the continuous empty-block addresses "1" to "4" fetched in step S3405 in one set, and makes units of the sets of the continuous empty-block addresses and the first identifiers (hereinafter, "unit-empty-block address"). Therefore, the number of "unit-empty-block addresses" corresponds to the number of first identifiers fetched in step S3402. Next, the destination determining part 1803 rearranges the "unit-empty-block addresses" at random, and manages the result of rearranging the "unit-empty-block addresses" as a part of one address position file (step S3406).

Specifically, the destination determining part 1803, when fetching the empty-block addresses "1" to "4" for each of the first identifiers SCSIa to SCSIc, arranges the four continuous empty-block addresses to one set to make a unit-empty-block address, and makes a set of the SCSI addresses and the unit-empty-blocks address. The set will be described as (SCSIa;1 to 4) below. Also, the destination determining part 1803 makes the "unit-empty-block addresses" for the SCSI addresses SCSIb and SCSIc in the same manner. The destination determining part 1803 also rearranges, at random, the "unit-empty-block addresses" as described above. Here, it is assumed that the result of rearranging the "unit-empty-block addresses" is [(SCSIb;1 to 4), (SCSIa;1 to 4), (SCSIc;1 to 4)] (see column (a) of FIG. 18).

Next, the destination determining part 1803, after incrementing the present value of the counting part by the number of empty-block addresses fetched in step S3405, compares the present value of the counting part with the "specified block size" (step S3407). When the present value is smaller than the "specified block size", the destination determining part 1803 executes a loop (steps S3405 to S3407) again. On the other hand, when the present value of the counting part is the same as the "specified block size" or larger, the destination determining part 1803 ends the operations according to the flow chart shown in FIG. 17.

Here, an address position file 3501 shown in FIG. 18 is created according to the above-described operations. The first address position file 3501 has the same configuration as described in the first embodiment, allowing the storage devices to uniquely recognize destinations of data-blocks.

The storage device control unit 1804 receives the address position files determined as described above, and writes data-blocks into which data is divided, into the storage devices according to the address position files as described in the first embodiment.

As described in Background Art section, there are cases in which data-blocks are preferably distributed to continuous areas of the same storage device. Therefore, the system according to the present embodiment changes the number of fetched empty-block addresses according to a bandwidth which is required to access data. Thereby, the application of the present system leads to an improvement in operation efficiency of video servers.

In the above-described embodiment, the number of fetched empty-block addresses is discussed as being determined according to the bandwidth. However, instead of determining the number of empty-block addresses to be fetched based on the bandwidth, the number may be determined based on characteristics of data similar to the bandwidth.

In the above description, the storage device management systems according to the fifth to seventh embodiments are described in the manner combined with the storage device management system according to the first embodiment. However, they can be combined with each of the storage device management systems according to the second to fourth embodiments, and moreover, after two storage device management systems is created among the storage management systems according to the fifth to seventh embodiments, it is possible to combine that set with each of the first to fourth embodiments.

While the invention has been described in detail, the foregoing description is in all aspects illustrative and not restrictive. It is understood that numerous other modifications and variations can be devised without departing from the scope of the invention.

What is claimed is:

1. A storage device management system for distributively storing data-blocks to a plurality of storage devices, wherein data is divided into the data-blocks which are stored in the plurality of storage devices, and wherein each of the plurality of storage devices is provided with a different first identifier, said storage device management system comprising:

a configuration managing part for storing the first identifiers which identify each of the plurality of storage devices;

an empty area managing part for storing an address of an empty area for each of the plurality of storage devices into which the data-blocks can be written; and a destination determining part for determining destinations of the data-blocks by creating a set of the first identifier and the address of the empty area for each of the plurality of storage devices by fetching the first identifiers from said configuration managing part and fetching the addresses of the empty areas from said empty area managing part to obtain an order of sets, and randomly rearranging the order of the sets.

2. A storage device management system as claimed in claim 1, wherein said destination determining part creates and outputs an address position file which contains the randomly rearranged sets, and wherein said storage device management system further comprises:

a control unit for receiving the address position file output from said destination determining part, wherein said control unit controls the writing of the data-blocks into the plurality of storage devices based upon the address position file.

3. A storage device management system as claimed in claim 1, wherein:

said configuration managing part stores a distribution rate of each of the plurality of storage devices, the distribution rate indicating at least one of a bandwidth and a storage capacity of the storage device compared to at least one of a bandwidth and a storage capacity of all of the plurality of storage devices; and said destination determining part determines the destinations of the data-blocks by creating the set of the first identifier and the address of the empty area for each of the plurality of storage devices based upon the distribution rate.

4. A storage device management system as claimed in claim 3, wherein the distribution rate is calculated as follows:

distribution rate=(bandwidth of storage device)/(total bandwidth of all storage devices).

5. A storage device management system as claimed in claim 3, wherein the distribution rate is calculated as follows:

distribution rate=(capacity of storage device)/(total capacity of all storage devices).

6. A storage device management system as claimed in claim 3, wherein the distribution rate is calculated as follows:

distribution rate={(bandwidth of the storage device)/(total bandwidth of all storage devices)}×$\alpha$+{(capacity of storage device)/(total capacity of all storage devices)}×(1−$\alpha$);

wherein a satisfies $0<\alpha<1$.

7. A storage device management system for distributively storing data-blocks to a plurality of storage devices, wherein data is divided into the data-blocks which are stored in the plurality of storage device, the plurality of storage devices are divided into a predetermined number of groups, each of the storage devices belonging to a same group is provided with a different first identifier, and each of the groups is provided with a different second identifier, said storage device management system comprising:

a configuration managing part for storing the first identifiers and the second identifiers;

an empty area managing part for storing an address of an empty area for each of the plurality of storage devices into which the data-blocks can be written; and a destination determining part for determining destinations of the data-blocks by:

selecting at least part of the groups by fetching the first and second identifiers from said configuration managing part, and by fetching the address of the empty areas from said empty area managing part;

selecting one storage device for each group at random so that the same storage device is not selected until all storage devices belonging to the group are selected;

creating a set of the first and second identifiers and the address of the empty area for each of the selected storage devices to obtain an order of sets; and randomly rearranging the order of the sets.

8. A storage device management system as claimed in claim 7, wherein said destination determining part creates and outputs an address position file which contains the randomly rearranged sets, and wherein said storage device management system further comprises:

a control unit for receiving the address position file output from said destination determining part, and wherein said control unit controls the writing of the data-blocks into the plurality of storage devices based upon the address position file.

9. A storage device management system as claimed in claim 7, wherein:

said configuration managing part stores a first distribution rate and a second distribution rate of each of the plurality of storage devices, the first distribution rate indicating at least one of a bandwidth and a storage capacity of a storage device compared to at least one of a bandwidth and a storage capacity of all of the storage devices in the same group as the storage device, and the second distribution rate indicating at least one of a bandwidth and a storage capacity of all of the storage devices in a group compared to at least one of a bandwidth and a storage capacity of all the storage devices in each of the groups; and said destination determining part determines the destinations of the data-blocks by creating the set of the first and second identifiers and the address of the empty area for each of the plurality of storage devices based upon the first and second distribution rates.

10. A storage device management system as claimed in claim 9, wherein the first distribution rate is calculated as follows:

first distribution rate=(bandwidth of storage device)/(total bandwidth of all storage devices in the same group as the storage device).

11. A storage device management system as claimed in claim 9, wherein the first distribution rate is calculated as follows:

first distribution rate=(capacity of storage device)/(total capacity of all storage devices in the same group as the storage device).

12. A storage device management system as claimed in claim 9, wherein the first distribution rate is calculated as follows:

first distribution rate={(bandwidth of the storage device)/(total bandwidth of all storage devices in the same group as the storage device)}×$\alpha$+{(capacity of storage device)/(total capacity of all storage devices in the same group as the storage device)}×(1−$\alpha$);

wherein a satisfies $0<\alpha<1$.

13. A storage device management system as claimed in claim 9, wherein when a remaining number of data-blocks whose destination are yet to be determined is less than a number of the plurality of storage devices, said destination determining part creates the sets of the first and second identifiers and the address of the empty area for each of the plurality of the storage devices based on a number of empty blocks existing in each of the plurality of storage devices.

14. A storage device management system as claimed in claim 9, wherein said destination determining part selects a predetermined number of successive sets from the rearranged sets, determines whether first identifiers identical to each other exist in the selected sets, and further randomly rearranges the rearranged sets if it is determined that first identifiers identical to each other exist in the selected sets.

15. A storage device management system as claimed in claim 9, wherein when a plurality of data having different characteristics are stored in the plurality of storage devices, said destination determining part fetches addresses corresponding to the data having different characteristics and groups the fetched addresses into a collection, and wherein said destination determining part creates the sets of the first and second identifiers and the address of the empty area for each of the plurality of storage devices by using the collection of addresses.

16. A storage device management system as claimed in claim 15, wherein the different characteristics of the plurality of data is a volume of data to be stored in the plurality of storage devices, and wherein said destination determining part fetches a predetermined number of the addresses of empty areas based on the volume of data.

17. A storage device management method for distributively storing data-blocks to a plurality of storage devices, wherein data is divided into the data-blocks which are stored in the plurality of storage devices, and wherein each of the plurality of storage devices is provided with a different first identifier, said storage device management method comprising:

storing, in a configuration managing part, the first identifiers which identify each of the plurality of storage devices;

storing, in an empty area managing part, an address of an empty area for each of the plurality of storage devices into which the data-blocks can be written; and determining, using a destination determining part, destinations of the data-blocks by creating a set of the first identifier and the address of the empty area for each of the plurality of storage devices by fetching the first identifiers from the configuration managing part and fetching the addresses of the empty areas from the empty area managing part to obtain an order of sets, and randomly rearranging the order of the sets.

18. A storage device management method as claimed in claim 17, wherein the destination determining part creates and outputs an address position file which contains the randomly rearranged sets, and wherein said storage device management method further comprises:

receiving, in a control unit, the address position file output from the destination determining part, wherein the control unit controls the writing of the data-blocks into the plurality of storage devices based upon the address position file.

19. A storage device management method as claimed in claim 17, wherein:

the configuration managing part stores a distribution rate of each of the plurality of storage devices, the distribution rate indicating at least one of a bandwidth and a storage capacity of the storage device compared to at least one of a bandwidth and a storage capacity of all of the plurality of storage devices; and the destination determining part determines the destinations of the data-blocks by creating the set of the first identifier and the address of the empty area for each of the plurality of storage devices based upon the distribution rate.

20. A storage device management method as claimed in claim 19, wherein the distribution rate is calculated as follows:

distribution rate=(bandwidth of storage device)/(total bandwidth of all storage devices).

21. A storage device management method as claimed in claim 19, wherein the distribution rate is calculated as follows:

distribution rate=(capacity of storage device)/(total capacity of all storage devices).

22. A storage device management method as claimed in claim 19, wherein the distribution rate is calculated as follows:

distribution rate={(bandwidth of the storage device)/(total bandwidth of all storage devices)}×α+{(capacity of storage device)/(total capacity of all storage devices)}×(1−α);

wherein a satisfies $0<\alpha<1$.

23. A storage device management method for distributively storing data-blocks to a plurality of storage devices, wherein data is divided into the data-blocks which are stored in the plurality of storage device, the plurality of storage devices are divided into a predetermined number of groups, each of the storage devices belonging to a same group is provided with a different first identifier, and each of the groups is provided with a different second identifier, said storage device management method comprising:

storing, in a configuration managing part, the first identifiers and the second identifiers;

storing, in an empty area managing part, an address of an empty area for each of the plurality of storage devices into which the data-blocks can be written; and determining, using a destination determining part, destinations of the data-blocks by:

selecting at least part of the groups by fetching the first and second identifiers from the configuration managing part, and by fetching the address of the empty areas from the empty area managing part;

selecting one storage device for each group at random so that the same storage device is not selected until all storage devices belonging to the group are selected;

creating a set of the first and second identifiers and the address of the empty area for each of the selected storage devices to obtain an order of sets; and randomly rearranging the order of the sets.

24. A storage device management method as claimed in claim 23, wherein the destination determining part creates and outputs an address position file which contains the randomly rearranged sets, and wherein said storage device management method further comprises:

receiving, in a control unit, the address position file output from the destination determining part, wherein the control unit controls the writing of the data-blocks into the plurality of storage devices based upon the address position file.

25. A storage device management method as claimed in claim 23, wherein:

the configuration managing part stores a first distribution rate and a second distribution rate of each of the plurality of storage devices, the first distribution rate indicating at least one of a bandwidth and a storage capacity of a storage device compared to at least one of a bandwidth and a storage capacity of all of the storage devices in the same group as the storage device, and the second distribution rate indicating at least one of a bandwidth and a storage capacity of all of the storage devices in a group compared to at least one of a bandwidth and a storage capacity of all the storage devices in each of the groups; and the destination determining part determines the destinations of the data-blocks by creating the set of the first and second identifiers and the address of the empty area for each of the plurality of storage devices based upon the first and second distribution rates.

26. A storage device management method as claimed in claim 25, wherein the first distribution rate is calculated as follows:

first distribution rate=(bandwidth of storage device)/(total bandwidth of all storage devices in the same group as the storage device).

27. A storage device management method as claimed in claim 25, wherein the first distribution rate is calculated as follows:

first distribution rate=(capacity of storage device)/(total capacity of all storage devices in the same group as the storage device).

28. A storage device management method as claimed in claim 25, wherein the first distribution rate is calculated as follows:

first distribution rate={(bandwidth of the storage device)/(total bandwidth of all storage devices in the same group as the storage device)}×$\alpha$+{(capacity of storage device)/(total capacity of all storage devices in the same group as the storage device)}×(1−$\alpha$);

wherein a satisfies $0<\alpha<1$.

29. A storage device management method as claimed in claim 25, wherein when a remaining number of data-blocks whose destination are yet to be determined is less than a number of the plurality of storage devices, the destination determining part creates the sets of the first and second identifiers and the address of the empty area for each of the plurality of the storage devices based on a number of empty blocks existing in each of the plurality of storage devices.

30. A storage device management method as claimed in claim 25, wherein the destination determining part selects a predetermined number of successive sets from the rearranged sets, determines whether first identifiers identical to each other exist in the selected sets, and further randomly rearranges the rearranged sets if it is determined that first identifiers identical to each other exist in the selected sets.

31. A storage device management method as claimed in claim 25, wherein when a plurality of data having different characteristics are stored in the plurality of storage devices, the destination determining part fetches addresses corresponding to the data having different characteristics and groups the fetched addresses into a collection, and wherein the destination determining part creates the sets of the first and second identifiers and the address of the empty area for each of the plurality of storage devices by using the collection of addresses.

32. A storage device management method as claimed in claim 31, wherein the different characteristics of the plurality of data is a volume of data to be stored in the plurality of storage devices, and wherein the destination determining part fetches a predetermined number of the addresses of empty areas based on the volume of data.

* * * * *